Aug. 11, 1936.　　　F. SCHLAYER　　　2,050,631
AXIAL THRESHING AND STRAW REDUCING MACHINE
Filed March 11, 1931　　　11 Sheets-Sheet 1
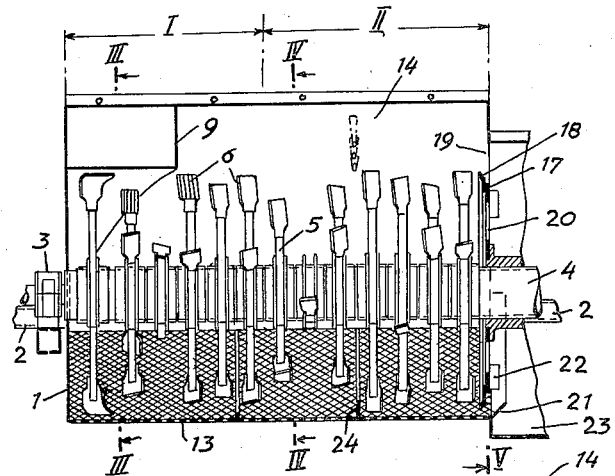
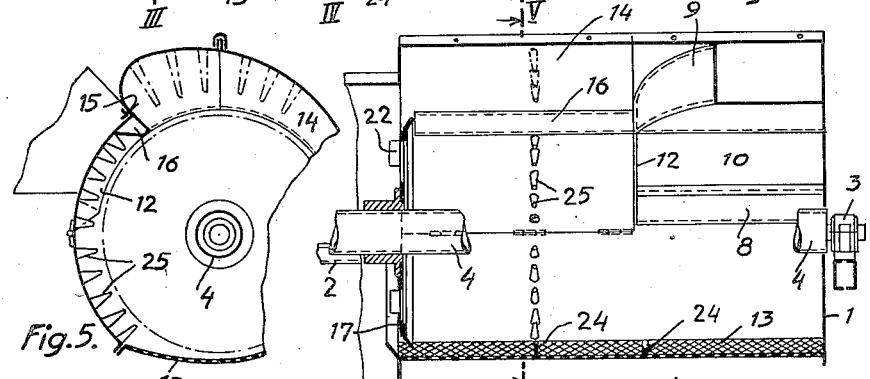
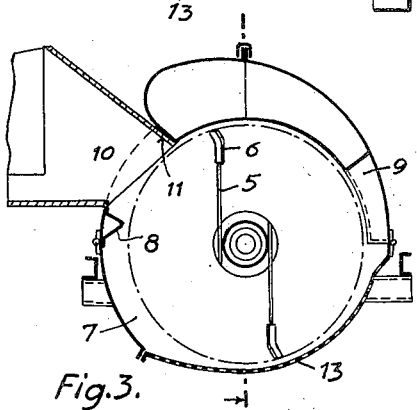
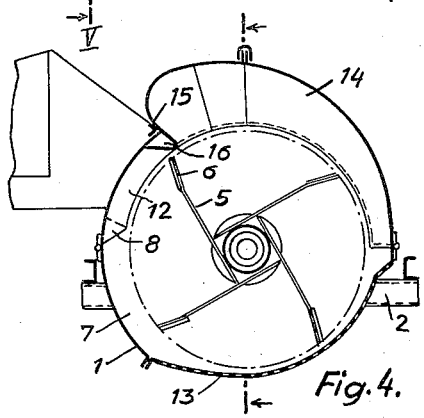
INVENTOR:
Felix Schlayer

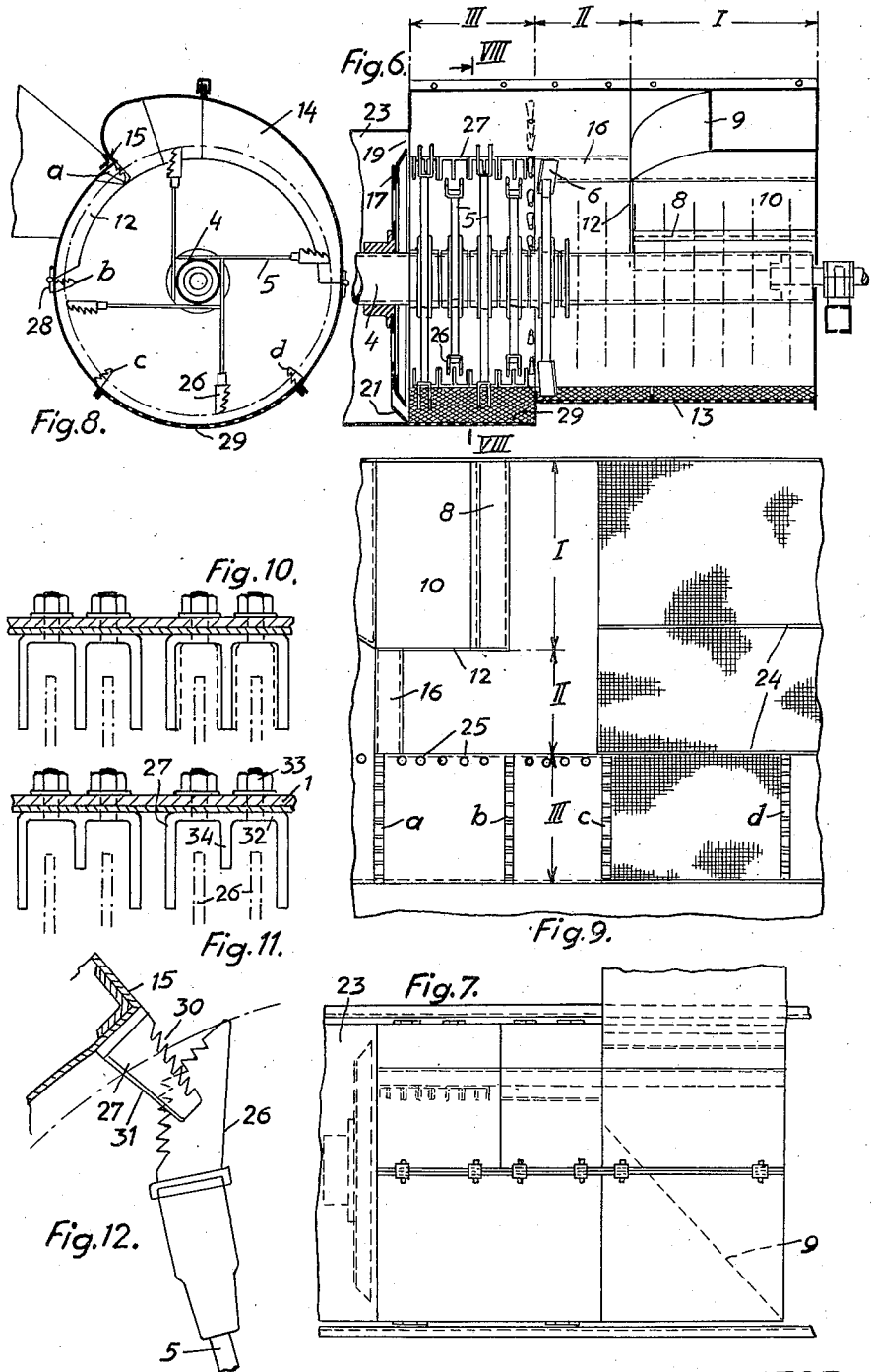

Aug. 11, 1936.  F. SCHLAYER  2,050,631
AXIAL THRESHING AND STRAW REDUCING MACHINE
Filed March 11, 1931  11 Sheets-Sheet 3

INVENTOR:
Felix Schlayer

Aug. 11, 1936. F. SCHLAYER 2,050,631
AXIAL THRESHING AND STRAW REDUCING MACHINE
Filed March 11, 1931 11 Sheets-Sheet 4
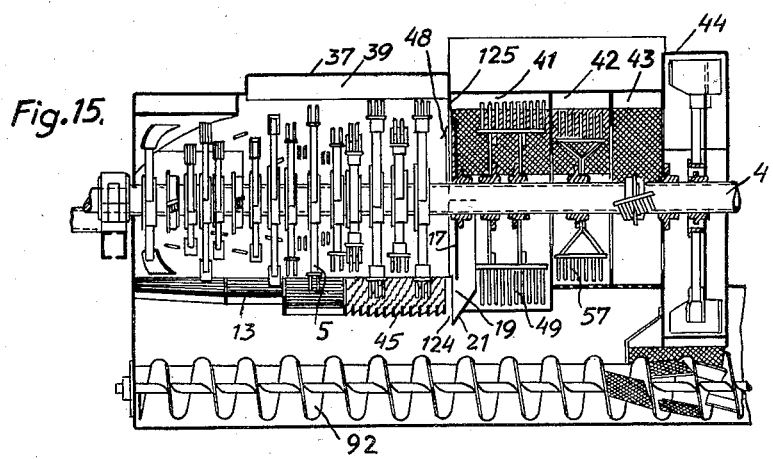
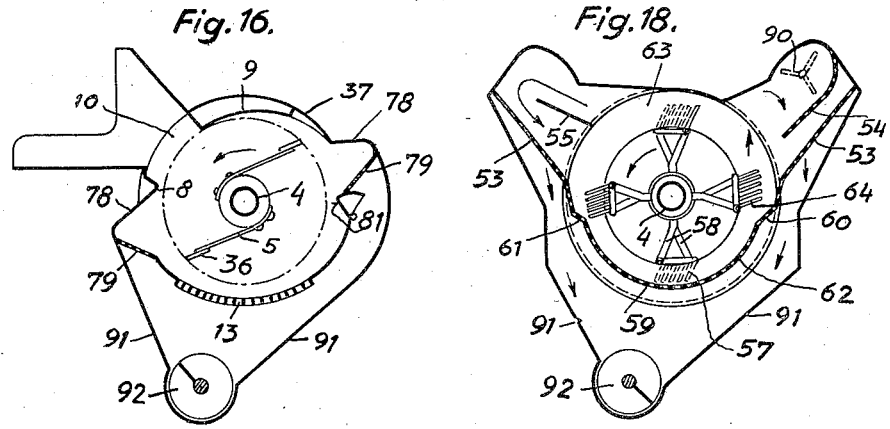
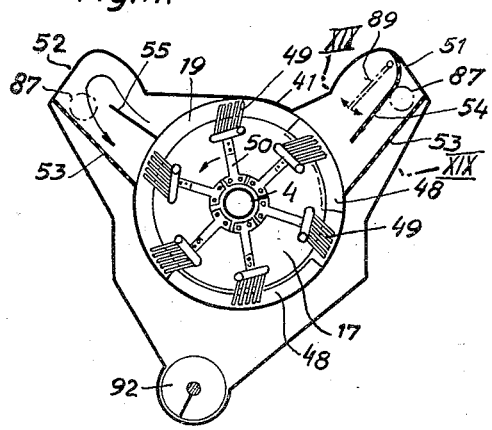
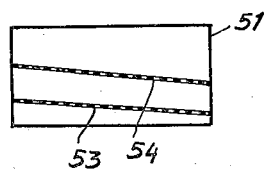

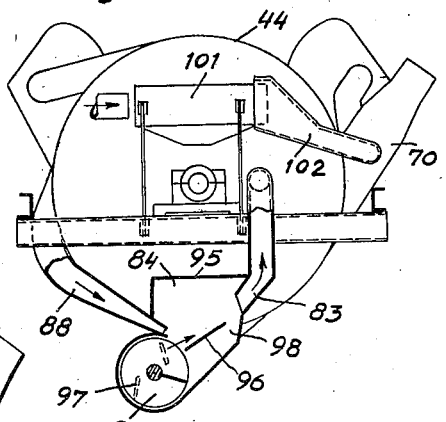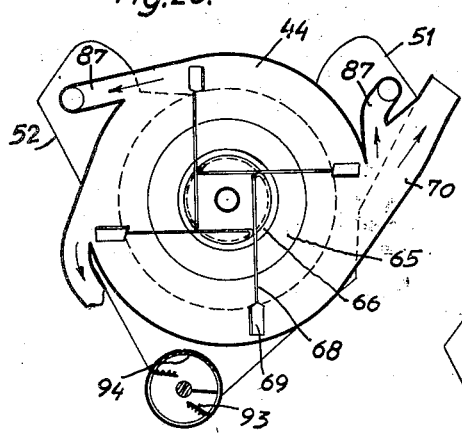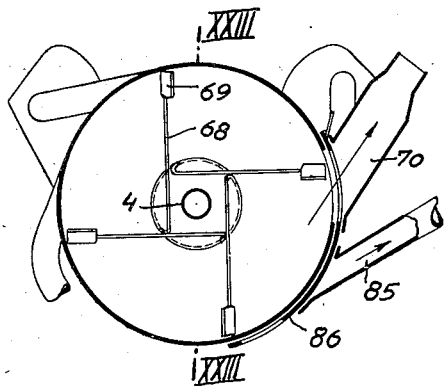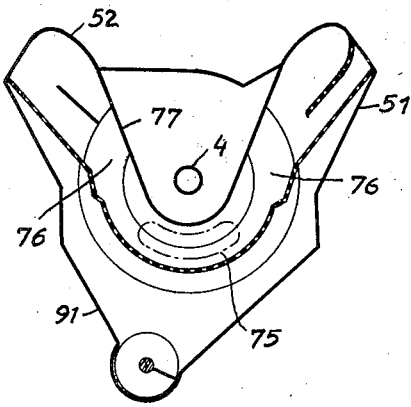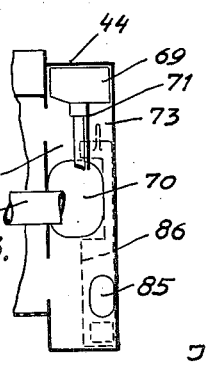

Aug. 11, 1936.                F. SCHLAYER                2,050,631
              AXIAL THRESHING AND STRAW REDUCING MACHINE
                 Filed March 11, 1931      11 Sheets-Sheet 6

INVENTOR:

Felix Schlayer

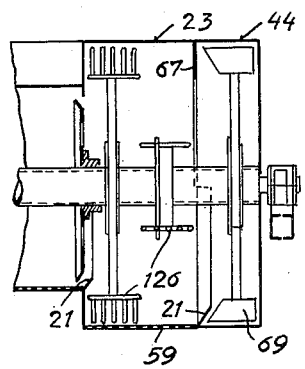
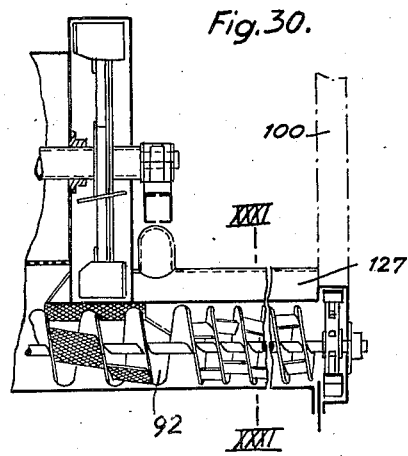
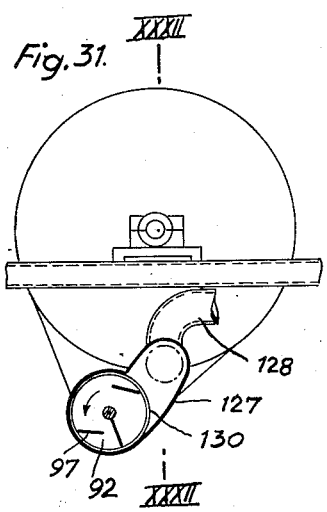
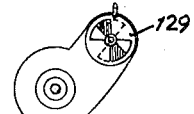
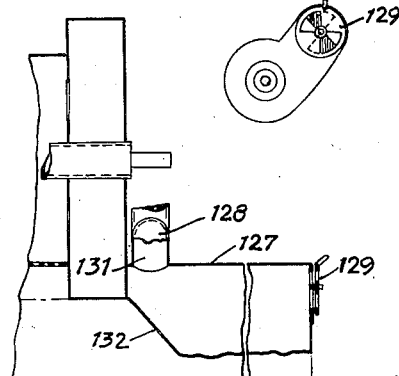

Aug. 11, 1936.   F. SCHLAYER   2,050,631
AXIAL THRESHING AND STRAW REDUCING MACHINE
Filed March 11, 1931   11 Sheets-Sheet 8

INVENTOR:
Felix Schlayer

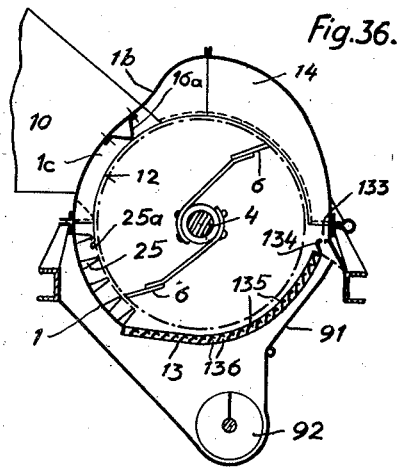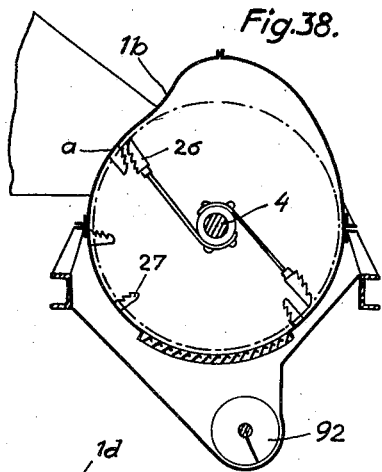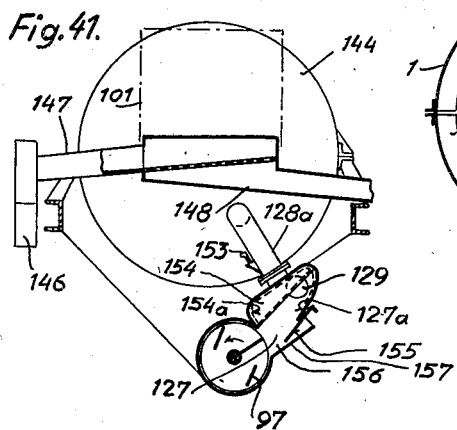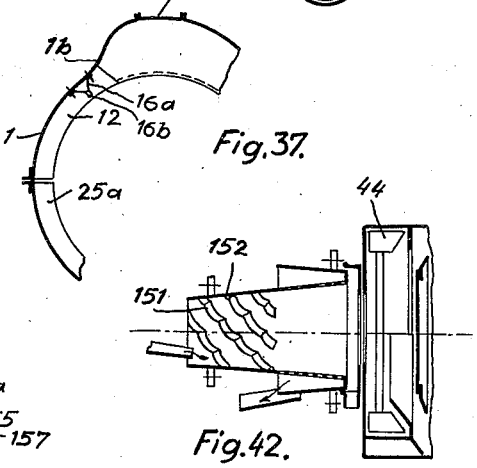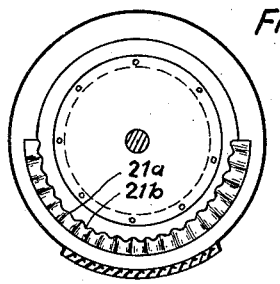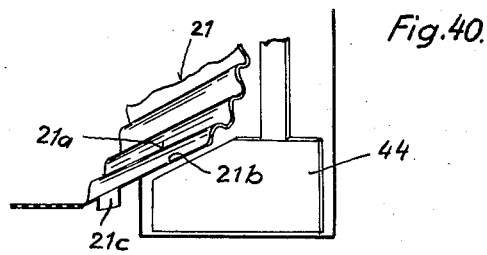

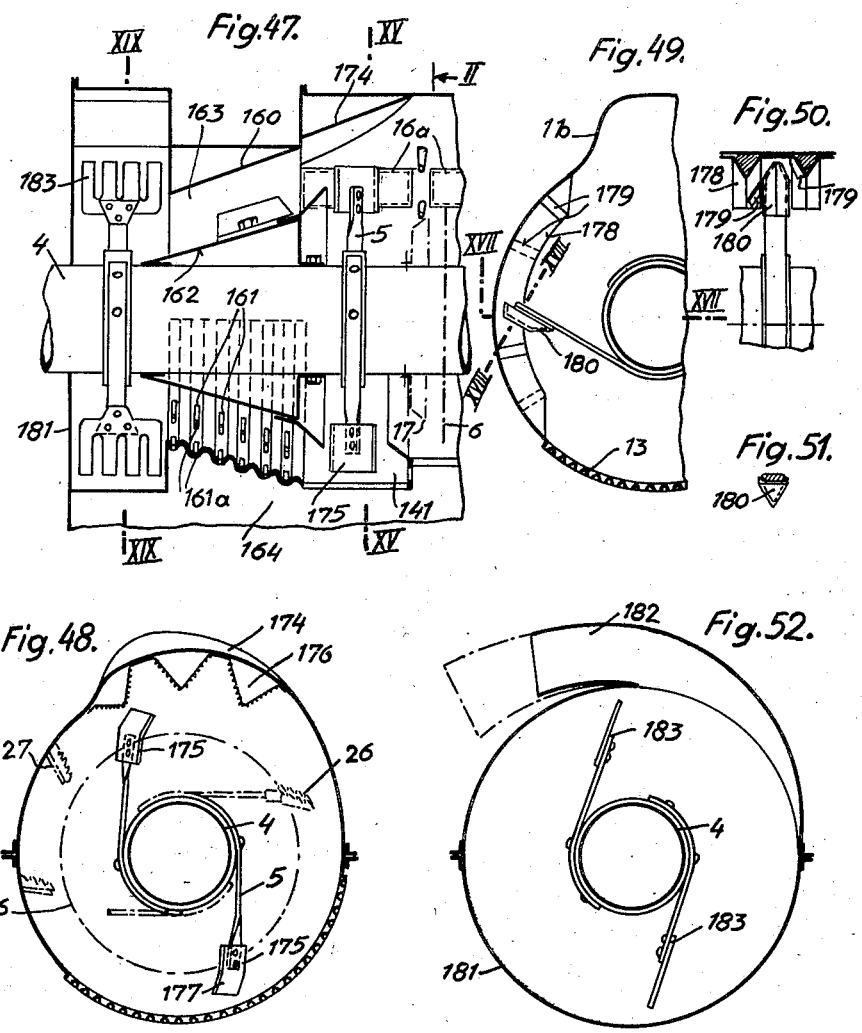

Patented Aug. 11, 1936

2,050,631

UNITED STATES PATENT OFFICE 2,050,631

AXIAL THRESHING AND STRAW-REDUCING MACHINE

Felix Schlayer, Madrid, Spain, assignor to Clotilde Schlayer, Berlin-Dahlem, Germany Application March 11, 1931, Serial No. 521,844
In Austria March 11, 1930

52 Claims. (Cl. 130—27)

The invention relates to axial threshing machines or axial threshing and straw-reducing machines and has for object novel features which put the threshing of grain, the reduction of straw, the separation of corn and straw and finally the cleaning of corn upon a new basis which entirely conforms to the peculiarity of these axial machines that consists in the helicoidal movement of the material. The function of the novel features consists in the fact that they allow the material, during the individual operations, to leave the circulation and to slow down its movement and then lead it into circulation again.

In threshing, one endeavours to obtain, while excluding stalk destruction as far as possible, a pure beating action such as is produced at the inlet end of the machine when there are provided there a threshing ledge on one side of the feed opening and a guide member, that leads off the material axially, on the other side of the feed opening. The one or more repetitions of the beating action as the material runs through the machine is, or are, produced by devices which effect a tangential guiding of the material from its circulation, which is unhindered by abutments, and out of the reach of beating members formed with broad surfaces, and then, after reducing its velocity of movement, again return the material, by deflecting it into circulation in a direction which crosses the circle of rotation of the ends of the beaters at an angle that is favourable for the beating action. In particular, the invention provides an automatic discharge, deflection and return of the material being threshed, by the arrangement of an enlargement of the casing which runs along the top part of the machine and on which the grain glides along without disturbance. To the deflecting wall there is advantageously connected an abutment over which the material runs to the broad surfaced beaters that end at a certain distance in front of it.

The invention reduces the power requirement of the machine, makes it simpler and cheaper because the abutments, usually employed on the inside of the machine casing, are omitted, delivers softer and less reduced stalks and simplifies the separation of the grains which leave the comparatively long straw for the very greater part merely on its being moved away over the sieve which forms the bottom of the casing.

In the reducing machine the enlargement of the casing serves for spreading the straw to be reduced in the longitudinal direction of the machine in thick bunches to tearing members arranged like rakes and provided on the wall of the casing, whence it then reaches other groups, arranged at certain distances from each other, of fixed beating members which, preferably in contradistinction to the first row of reducing members which effect a preliminary reduction, are constructed as main tearing and softening members. This new kind of straw reduction has the advantage of increasing the output of the machine without increasing the consumption of power, the supply of softer short straw even with greater lengths of the straw parts, and the shortening of the construction of the reducing portion.

In the separation of corn and straw in axial threshing machines or in axial threshing and straw-reducing machines, the material rotating in the machine casing is diverted from its forced circulation in order to allow the inherent energies of different magnitudes of the corn and straw, which are utilizable for the separating action, to have their effect. Taking part in the separating operation are centrifuging and stirring members which throw the material in thin, wide layers on to sieves which are arranged in special recesses of the machine wall and upon which the velocity of the material is reduced. The grains, owing to centrifugal action, gravity or like action, leave the straw and pass through the sieve openings, from which they are led to the winnowing devices.

The invention enables large quantities of straw to be subjected to the treatment with a good separating action, because only simple devices are necessary which are better adapted to the form and mode of operation of the axial threshing machine than are the shaking and winnowing devices that are usual with ordinary threshing machines.

The letting out of the material to be treated from its circulation and thus slowing down the movement of the grains, is, according to the invention, also employed in winnowing corn in axial machines of the kind stated, by throwing the corn, by means of a centrifuging device preferably in the form of a conveying worm, transversely through a (suction) current of air, against surfaces which effect the slowing down or the stoppage of the movement of the corn and, if required, its return, whilst the admixed straw parts are carried along by the current of air.

The invention is illustrated by way of example by the accompanying drawings, of which Fig. 1 shows one half and Fig. 2 the other half of an axial threshing machine, supplying litter straw, cut through the vertical, longitudinal medial plane;

Fig. 3 is a section on the line III—III of Fig. 1;

Fig. 4 is a section on the line IV—IV of Fig. 1;

Fig. 5 is a section on the line V—V of Fig. 2;

Fig. 6 shows an axial threshing and straw-reducing machine in vertical, longitudinal medial section and Fig. 7 shows this machine in plan;

Fig. 8 is a cross-section on the line VIII—VIII of Fig. 6;

Fig. 9 shows the inside of the machine unrolled;

Figs. 10 and 11 are plans of stationary tearing members;

Fig. 12 is a side view of co-operating stationary and rotating tearing members;

Fig. 15 is a similar section through a further construction of the machine;

Fig. 16 is a section on the line XVI—XVI of Fig. 14;

Fig. 17 is a section on the line XVII—XVII of Fig. 14;

Fig. 18 is a section on the line XVIII—XVIII of Fig. 14;

Fig. 19 is a section on the line XIX—XIX of Fig. 17;

Fig. 20 is a section on the line XX—XX of Fig. 14;

Fig. 21 is a section through another construction of the discharge chamber;

Fig. 22 is a cross-section and Fig. 23, a section on the line XXIII—XXIII of Fig. 22 of a special form of a blast exit position;

Fig. 24 is a section on the line XXIV—XXIV of Fig. 14;

Fig. 29 is a vertical, longitudinal medial section through another construction of a machine for the after-treatment of the short straw;

Fig. 30 is a vertical, longitudinal medial section through the worm of a device for winnowing the grains;

Fig. 31 is a cross-section on the line XXXI—XXXI of Fig. 30;

Fig. 32 is a section on the line XXXII—XXXII of Fig. 31;

Fig. 33 is an end view of the separating chamber;

Fig. 36 is a section on the line 36—36 of Fig. 35;

Fig. 37 shows a different formation of the top half of the machine;

Fig. 38 is a section on the line 38—38 of Fig. 35;

Fig. 39 shows an inclined face between two chambers of the machine and Fig. 40 is a longitudinal section through such a face;

Fig. 41 is a section on the line 41—41 of Fig. 35;

Fig. 42 is a vertical longitudinal medial section through a different construction of the winnowing device;

Fig. 47 is a vertical, longitudinal medial section through a differently constructed discharge end of an axial threshing machine;

Figs. 48 and 49 are cross-sections on the line XV—XV of Fig. 47 with the arrangement of different kinds of tearing and softening members;

Figs. 50 and 51 are sections on the lines XVII—XVII and XVIII—XVIII respectively of Fig. 49; and Fig. 52 is a section on the line XIX—XIX of Fig. 47.

Figure 13:
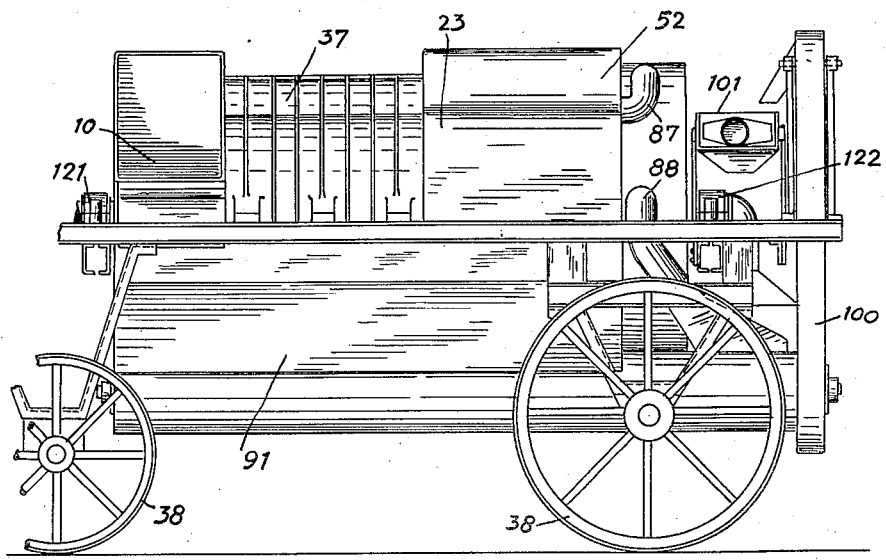
Fig. 13 is a side view of an axial threshing and straw-reducing machine of another construction.

The casing 1 of an axial threshing machine (Figs. 1 to 5) is so formed that it reduces the straw comparatively little, for the purpose of keeping it serviceable as stable litter (long straw). The preferably hollow shaft 4, that is mounted on the machine frame 2 at 3 at the front and rear ends of the machine, carries beaters 5 which are provided at their free ends with wide, preferably grooved threshing plates 6 and are secured to collars on the shaft.

Between the casing 1, which has no stalk destroying abutments, and the threshing plates 6 there is located a wide annular space 7, which is interrupted in the inlet zone I by a threshing ledge 8 and a guide member 9. The threshing ledge 8 lies beneath the feed opening 10. Its top surface slopes down towards the machine space and it extends to near the circle of rotation of the plates 6. The guide member 9, which likewise extends to fairly near the circle of rotation of the plates, is a wedge-shaped body which extends in about the horizontal medial plane of the machine from the front end wall and ends in the breadth of the feed opening in front of its top wall 11. A radial wall 12 arranged between the guide member 9 and the ledge 8, separates the feeding postion in the axial direction from the threshing zone II. The sieves 13, which are flat or only slightly curved in the ascending part and are cylindrical in the descending part form the bottom of the casing and are, throughout the whole length of the machine brought close to the circle of rotation of the beaters.

The machine casing 1 has at the top a pocket-like eccentric enlargement 14 which commences slightly above the horizontal medial plane of the machine at the wall that is opposite to the feed opening 10, first extends upwards in a tangential direction and then passes with continual curvature into a deflecting surface 15 which is directed towards the interior of the machine. This enlargement 14 extends from the guide member 9 up to the last series of beaters. At the place at which the deflecting wall 15 turns into the threshing zone, there is provided a specially fitted threshing ledge 16, which, like the ledge 8, extends with its front face fairly close to the circle of rotation of the plates. The threshing ledge 16 can also be formed directly by the machine casing.

The rear end of the threshing zone II is formed by an end disc 17, fixed on the shaft 2, with an exchangeable rim 18 bent towards the beaters, the diameter of the disc and rim being such that between the rim and the casing 1 there remains an annular space 19 which is sufficiently wide for the discharge of the straw. Openings 20 in the disc 17 serve for letting in working air. Behind the disc 17 there is located a conically shaped inclined face 21 which starts from the surface of the sieve 13 and which deflects the straw being discharged and thus separates off grains. Wind vanes 22 are arranged on the rear side of the end disc. Devices or machines 23 may be connected to the discharge end of the threshing machine (Fig. 1 and 2) for the after-treatment of the straw, for example for the purpose of obtaining any grains still contained in the straw.

The beaters 5, helically arranged and preferably unequal in number in the separate series of beaters, are set so that about nine or ten consecutive beaters form a complete helical turn. This arrangement has for an object inter alia, an improved softening of the straw.

Approximately behind the fifth and ninth series of beaters counted from the front end of the machine, there is located on the sieve in each case a comparatively low obstructing wall 24 in a plane at right angles to the shaft 4 of the beaters.

In the plane of the rear obstructing wall 24 radial pins 25 are provided at suitable distances from each other on the portion of the casing wall located between the deflecting surface 15 and the sieve 13. They extend approximately up to the circle of rotation of the plates 6 and their object is, inter alia, to prevent the material being threshed from too rapid movement in the axial direction. These pins may be provided at a number of places—if required also behind the sieves 13 and also in the deflecting enlargement, where they are shown in broken lines.

The machine operates in the following manner:—

The grain supplied through the feed opening 10 is seized by the rotating threshing plates (beaters) 6 and beaten against the ledge 8, which forms a fixed abutment and thus enables a good beating action to be effected by the rotating bodies 6, so that even in the inlet zone a large part of the threshing operation is carried out. Owing to the special arrangement shown of the inlet position in relation to the direction of rotation of the beaters, the result is obtained that the bottom layers of the material are seized first and this causes the upper layers to be taken with automatically.

After leaving the threshing ledge 8, the material is loosened in the succeeding free annular space 7 and is then led over the sieves 13 (Fig. 3) for the purpose of separating off the grains. It then reaches the guide member 9 which leads it off axially rearwards (to the right in Fig. 1) through a distance equal to the width of the feed opening. The feeding movement is effected partly mechanically and partly pneumatically by the movement of the air produced in the casing.

During the axial feeding movement, the material being threshed leaves the circulation caused by the beaters and, owing to centrifugal action, tangentially enters the enlargement 14 where it is retarded and decelerated, while, by the deflecting wall 15 of which is then again forced to change its direction so that it again arrives, by way of the threshing ledge 16 (Fig. 4) within reach of the beaters. The result of this is a renewed powerful beating action on the material being threshed which is then comparatively little reduced, the material being reaccelerated by the beaters. It is then led in a closed condition in the annular space 7, located below the ledge 16, to the row of pins 25, when it partly passes between the pins and partly remains suspended therefrom. This special treatment has the advantage of a more powerful threshing, an improved softening of the straw and a smaller impedance to the movement of the working air. There is then effected on the sieves 13 a sifting of the straw, which now again passes from the circulation into the enlargement 14 and is there retarded and decelerated, to be again powerfully threshed on the threshing ledge 16 after deflection has taken place and it has been engaged by the beaters and reaccelerated. Thereupon, after being again sifted, it leaves the threshing zone through the annular space 19.

The machine has the further advantage that it does not become stopped up by heavy feeding. If, on a too abundant supply of grain, the space of the deflector enlargement, bounded laterally by the guide member 9 and the row of pins 25, is filled up and the succeeding layers are consequently prevented from being released from the beaters, these layers in the region of the enlargement move, with constant contact with the beaters, axially rearwards beneath the filling layer up to the other side of the plane of the row of pins, where they enter the enlargement and are then deflected and threshed.

This self regulation is a result of the co-operation of the enlargement and row of pins. The latter prevents a layer from being simply pushed on by the next layer. According to the degree to which the machine is filled, the first layer, after entering the end position of the machine, now runs behind the second layer that has passed it or crosses beneath this second layer, when the first layer and, it may be, the second layer also in the case of a sufficiently long machine, are again tangentially carried out, deflected and threshed. This mutual intersection of the layers means that the efficiency of the second threshing portion is greater than that of the inlet zone and that the cylinder itself regulates the velocity of running through the machine in accordance with the extent to which it is filled. According to whether it is desired to favour this operation of self regulation more or less, the pins in the enlargement are shorter or longer or less or more advanced up to the beginning of the enlargement. In addition the row of pins 25, the obstructing walls 24 and the low pitch of the beater helices are means to be used as required for the purpose of reducing the speed of the straw in the axial direction.

The rim 18 bent towards the inlet end has the function of preventing grains that bounce against the obstructing disc 17 from passing through the annular space and of deflecting them towards the sieves 13. The material blown by the working air against the inclined face 21 loses, owing to the deflection, a considerable portion of any grains still carried along by it. The separation is further favoured by the current of air which is produced by the wind vanes 22 and which has a loosening effect on the straw.

Instead of the enlargement 14 of the casing 1, special guide channels may be provided, which automatically allow the material to leave tangentially and re-enter radially. Instead of this automatic control, a more positive control, in a mechanical manner (rakes or the like) or in a pneumatic manner, is conceivable, in which case the guide elements need not be arranged directly at the top part of the casing.

In the case of the threshing and straw-reducing machine according to Figs. 6 to 12, the straw-reducing zone III is connected to the threshing zone II, the threshing members in the rear portion of the litter straw machine being replaced by tearing members. Instead of a threshing plate, there is arranged on each beater 5 a two-fingered saw-like tearing member 26 which co-operates with tearing fingers 27 on the casing wall (Figs. 6 and 10 to 12). The row of pins 25 is located between the threshing zone II and the reducing zone III.

The tearing fingers 27 are provided in one or more axial rows according to the desired fineness of the short straw. If one row $a$ is used, it is located at the deflecting surface 15 instead of the threshing ledge 16. A second row $b$ is arranged at the horizontal medial plane where it is preferably secured to one of the hinge corners 28 of the upper portion of the casing which is hinged as a lid. In order to obtain very fine (short) straw, a third row $c$ is fitted below the second row and directly in front of the bottom sieve 29 which is concentric with the shaft 4. Whilst these three rows extend through the whole length of the reducing zone III, a fourth row $d$, provided on the other side of the sieve 29 and serving especially for softening, is, as required, arranged only in the rear part of the reducing zone.

The stationary tearing fingers 27 are formed of a thick knife blade one edge of which is a blunt saw 30 and the other edge is a knife edge 31 (Fig. 12). An angularly bent off arm 32 of the knife blade serves for securing it to the casing wall 1 by being clamped to the casing wall with screws 33 in a line in the axial direction of the machine. Each arm has three knife blades or tearing fingers. The middle knives 34 of the three-fingered tearing member of the first row $a$ are of half length. In the second and third rows the middle knives are as long as the side knives, whilst the equally long knife blades of the last row $d$ have a larger thickness for the purpose of reducing the free passage of the material. By transposing the tearing members, by arranging gaps in them or in the individual rows of knives and the like, the tearing action can be regulated within wide limits. In general, the rotating two-fingered tearing member 26 passes through symmetrically between three fixed tearing fingers.

In the case of dry material, one endeavours to obtain a splitting of the straw during the tearing and softening operation. There are therefore used in this case as stationary counter-members the saws 30 which co-operate with the rotating sharp tearing fingers 26. In the case of damp straw, however, the comparatively sharp cutting edges 31 are used for the purpose of keeping the motor power small.

The degree of softness of the straw can also be influenced by using partly the saw 30 and partly the knife edge 31 or by producing a special squeezing action by a narrower positioning of the knives. A change in the length of the short straw may be effected by omitting individual knives from a row and arranging them in the next row in a staggered position.

At the exit end of the reducing zone III there are again located the already mentioned obstructing disc 17 and, if required, a device or machine 23 for the after-treatment of the short straw issuing through the annular space 19.

Both the threshing machine that gives the litter straw (long straw) and the threshing and straw-reducing machine may have more or less than the number of series of beaters represented.

The mode of operation of the threshing portion of the threshing and straw-reducing machine is the same as above described. The comparatively little cut up but already somewhat softened straw passes, at the end of the row of pins 25, in a fairly closed condition, on to sieve 13, then spreads itself on the smooth rising wall of the enlargement 14 and on its deflecting surface 15 in the longitudinal direction of the machine and is finally distributed on the first row of knives $a$ as a thick layer, and on the passage, between these knives, of the rotating tearing fingers 26, is again threshed and reduced with considerable softening.

From the first row $a$ of the knives 27, which effect a preliminary reduction, the straw moves on to the second and third rows $b$ and $c$, the knives of which serve as main tearing members. The material collects on the underlying sieve 29 and then, as a thick layer, enters the fourth row of knives $d$, which is especially provided for the softening. The other rows of knives represent rakes upon which the straw collects in bunches and, on the successively ensuing passages of the rotating members 26, is already softened.

The essence of this arrangement consequently consists, in the main, in that the material being reduced is not now allowed, as before, to run on successively to the individual tearing members helically distributed on the casing, but to transfer the stalks lying transversely to the beater shaft, in accordance with the feeding direction, in the enlargement of the reducing zone, into an axial direction. This direction is taken by the stalks in all cases when they strike the deflecting wall on which they then move along. The deflection is aided by the helical direction of the material on entering or passing through the enlargement. The effect of the operations is that the stalks distribute themselves uniformly in a thick wide layer transversely of the beaters through the whole length of the first row of knives, the deflecting zone serving as a collecting vessel. In this thick layer, the material is forced by the rotating tearing members through the stationary members, when it is split up and, owing to the mutual pressure of the stalks, is softened better than before when the individual stalks were directly squeezed between two tearing members. The material maintains the position transverse to the beaters also on its passage through the other rows of knives. As a special advantage, it may be mentioned that the machine is less liable to stopping up. Beyond the fourth row of knives $d$, the casing wall portion of the tearing knife between the sieve 29 and the enlargement 14 contains no projecting bodies.

Figure 14:
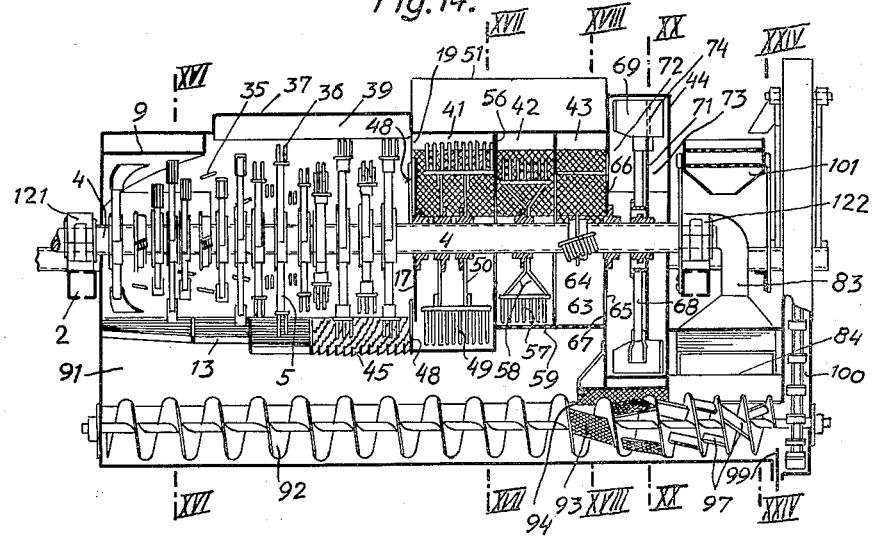
Fig. 14 is a substantially vertical medial section through the machine shown in Fig. 13.
Figure 35:
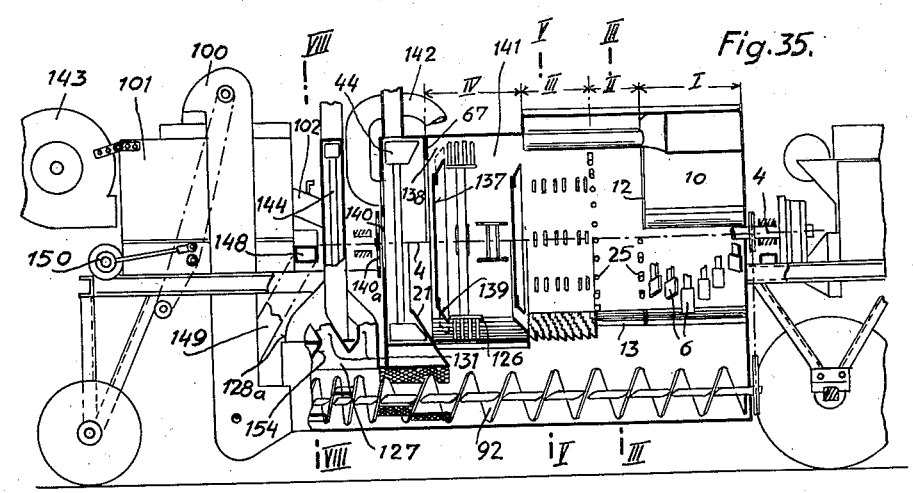

In Figs. 13 and 14, 35 denotes stationary abutments, 36 rotating working members on beaters 5, 37 the working cylinder, 38 running wheels of the frame 2, and 39 the enlargement formed on the top of the casing. It not only functions as a buffer space which serves for equalization in the case of unequal feeding of the grain, but it is also preferably formed of the unsymmetrical shape, depth, width and length of the part 14 above described for effecting the repeated retardations and reaccelerations.

Connected to the discharge end of the working cylinder 37 is the machine 23 for the after-treatment of the straw, the said machine consisting of two tossing chambers 41 and 42, an aspirating chamber 43 and a blower 44 which serves for the purpose of discharging the straw. The first comparatively long tossing chamber 41, the diameter of which agrees with the diameter of the rear portion 45 of the working cylinder 37, is separated from the latter, leaving an annular space 19, by means of an obstructing disc 17. For partially covering up the annular space 19 in the circumferential direction, wall strips 48 are provided which, for the purpose of regulating the degree of covering, are arranged so as to be capable of being changed or shifted. The bottom of the chamber 41 preferably has no sieve openings. Instead of two tossing chambers, one chamber or more than two chambers can be employed.

In the case of the construction according to Fig. 15, there is again provided, at the exit from the working cylinder 37 in the neighbourhood of the obstructing disc 17, an inclined face 21 which deflects the stream of material, issuing from the annular space 19, to the interior of the machine. The grains separated on this change of direction leave the working cylinder through a gap 124. In the upper portion of the working cylinder the annular space 19 is partially covered in the radial direction by a wall starting from the machine casing. By means of the above mentioned wall strips 48, a complete covering of the annular space can be effected. The width and inclination of the inclined face are in accordance with the power with which the material is hurled against it. In general, the natural wind of the machine is sufficient for blowing out the material. Special vanes or propelling blades may, however, be used. Such inclined faces may, if required, be provided, independently of the arrangement at the outlet, at other places of the working cylinder.

In the chamber 41 there operate six rakes 49 whose long prongs are set for propulsion of the material and are bent backwards in the direction of rotation. They are carried by arms 50. Their function is during rotation to toss the short straw or chaff, coming laterally from the annular space 19, in a thin wide layer into recesses 51 and 52 which start on both sides of the vertical, longitudinal medial plane of the chamber from its top wall (Fig. 17).

The recess 51 contains a sieve 53, inclined towards the interior of the chamber, at its bottom, above which a likewise inclined sieve 54, set back above the circle of rotation of the prong points and curved upwards somewhat at the outer end, is arranged. Above this sieve, which may also be a rake or a grid, is located the oppositely curved cover of the recess which deflects the material, tossed against it from below by the rakes 49, to the sieve 54. The opposite recess 52 has, in view of the other direction of entrance of the material, a guide surface 55 (Fig. 17) instead of the sieve 54.

The recesses extend backwards in the axial direction of the machine up to the blower 44 and are thus associated with the second tossing chamber 42 and the discharge chamber 43. The sieves 53 and 54 and the guide surface 55 are rearwardly downwardly inclined. The chambers 42 and 43 have a smaller diameter than the chamber 41. Chambers 41 and 42 are separated from each other by a wall 56 with a central opening 56'. The wall extends inwards to such an extent that it well covers laterally the rakes 49 and 57. The rakes 57 which are located in the chamber 42 are secured to the shaft 4 with arms 58. Their half-length prongs are likewise set forth for propulsion and bent backwards. The bottom of the chamber 42 consists for the largest part of a sieve 59 which passes on both sides by way of steps 60 and 61 into the bottom sieve surface 53 of the recesses 41 and 42. Below the step 60 there is located a preferably detachably arranged, solid wall portion 62 (Figs. 14, 15 and 18).

The formation of the chamber 43 is substantially like that of the chamber 42. The separating wall 63 is, however, of such small height than the prongs of the rakes 57 and the moving or pushing fingers 64 operating in the chamber 43 are only partly covered laterally. The openings in the walls 56 and 63 enable the natural wind issuing from the working cylinder 37 to flow towards the blower 44. The pushing fingers 64, preferably driven directly by the shaft 4, are also set for propulsion, but are bent forwards in the direction of rotation in order to obtain a better clearing out of the straw towards the blower with which the chamber 43 is connected by an annular space 65 (Figs. 14 and 20). This space is formed by a disc 66 on the shaft and a low radial wall 67 of the chamber casing (Figs. 14, 15 and 18).

The blower 44 comprises wind vanes 69 which are set obliquely to the direction of rotation and are carried by blade-shaped arms 68 and which discharge through the channel 70 the straw coming from the outlet chamber 43. A partition 71, secured behind the arms 68, forms two suction chambers 72 and 73, which, if required, continue into two pressure chambers, when the disc 71, by being replaced by a larger disc or, when by means of annular pieces 74 shown in broken lines, it is extended up to the peripheral wall of the blower. On arranging the disc 71, the vane-like arms 68, which may, if required, be specially widened, exert a blowing action in the chamber 72 (Fig. 14).

The outlet chamber 43 may also be tapered rearwardly, with the result that a blower of smaller diameter may be employed, or, as shown in Fig. 21, the straw outlet position of this chamber may be confined to an opening 75 (shown in broken lines) lying below the shaft, to which opening there lead channels 76 of gradually diminishing cross-section which start from the recesses 51 and 52.

Recesses 78, which serve for separating corn and straw, may also be arranged on the working cylinder 37—see especially Fig. 16. They are smaller than the recesses 51 and 52, are provided, preferably only in the bottom part, with a sieve 79 and are arranged behind a ledge 8 of the feed opening 10 and a threshing ledge 81 lying approximately diametrically opposite the ledge 8. 9 denotes the wedge-shaped guide member located in front of the feed opening. The material is tossed to the recesses 78 by the beaters 5 or the tools 36.

The recesses on the working cylinder may be used to such an extent, that special tossing chambers at the end of the machine become unnecessary.

The provision of a divided suction chamber 73 enables the blower to be utilized in an advantageous manner for winnowing purposes by, for example, connecting to this chamber the suction pipe 83 of a preliminary winnowing device 84. The sucked up chaff may, when two pressure chambers (Figs. 22 and 23) are present, be separately discharged through channel 85. If a common discharge is required, the straw channel 70, for example, is so arranged that it intersects the rear pressure chamber somewhat, in which case there is employed, at the connecting opening so produced, a shutting off member 86 that is displaceable on the periphery of the blower and, at the same time, adjoins the entrance to the chaff channel. In accordance with the position of the slide, the chaff is discharged by itself through channel 85, or, together with the straw, through channel 70.

The blower may also serve for supplying the machine with compressed air for other purposes. In order to achieve this, the wind vanes 69 are set very obliquely, so that the straw to be discharged moves along the outer edge, whilst clean air can be tapped off at the inner edge. The tapped-off compressed air is passed through pipes 87 into the recesses 51 and 52, preferably between the sieve steps 53, 54 and 55 in order to carry out there a good separation of corn and straw and to prevent a too powerful passage of small straw through the sieve faces. A further compressed air pipe 88 leads to the preliminary winnowing device 84 (Figs. 17 and 20).

A special blower, driven directly or indirectly by the shaft 4, may also be used for producing compressed air.

Fig. 17 shows the employment of stirring devices constructed, for example, as swinging rakes 89 and driven in a suitable manner, in the recesses for loosening the material to be separated. Fig. 18 shows rotating fingers 90 which fulfill the same purpose. The devices are also used, if required, when compressed air is supplied.

91 represents a special bottom casing of the machine, which receives the materials separated by the bottom sieves 13, the inclined face 21 and the separating devices 51, 52 and 78. In the tapering bottom portion of the casing runs a worm 92 which conveys the material to be winnowed to the rear end of the machine and in which, to obtain maximum simplicity, an awning device is built. This consists of removable tossing scoops 93 which toss the corn against roughened roofing plates 94. The tossing scoops may be in the form of roughened friction plates, or such plates may be used in addition. In the awner, the action of which is regulated by the employment of a smaller or larger number of tossing scoops or roughened surfaces, the grains are broken and the husks loosened.

The worm 92 is extended beyond the straw-discharging device 44. It forms with the extension a portion of the winnowing device 84 that pretreats the grains. The winnowing device 84 consists of a box-like structure 95 of the worm casing with an oblique guide wall 96, on to which plates 97, which decrease in size towards the outlet end and are placed between the screw turns, throw the material being winnowed. The compressed air pipe 88 ends with a wide opening above the worm and somewhat in front of the lower edge of the guide wall 96 (Fig. 24). At a certain distance behind the wall 96, the pipe 83 begins with a wide suction opening. 98 is a return channel for the corn. In the region of the winnowing device, the worm turns have a lower pitch. At the outlet of the worm casing, one or more adjustable shutting-off plates 99 are provided.

Connected with the preliminary winnowing device is an elevator 100, which raises the grains to a second winnowing device 101 of a usual kind. The straw separated from the second winnowing passes into a pipe 102 leading to the blower 44.

Figure 25:
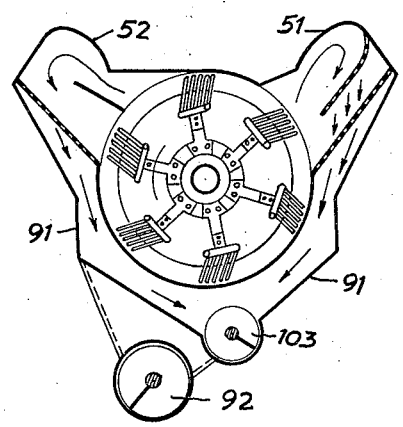
Fig. 25 is a cross-section through the tossing chamber of a machine with two worms.

According to Fig. 25, there is arranged laterally above the worm 92 an auxiliary worm 103, which receives the material being winnowed that has separated from the chambers 41, 42 and 43 or their recesses 51 and 52. The auxiliary worm may be extended forwardly for the purpose of receiving the material being winnowed that falls out of the reducing zone 45 and from the inclined face 21. It, preferably also possesses a preliminary winnowing device of the kind above described, whose suction pipes are connected to the main blower and whose pressure pipes are connected to the main blower or to the auxiliary blower. The material being winnowed discharged by it, arrives in the main worm 92 to which it is, if required, led before being led to the preliminary winnowing device 84 or the awner 93, 94.

Figure 26:
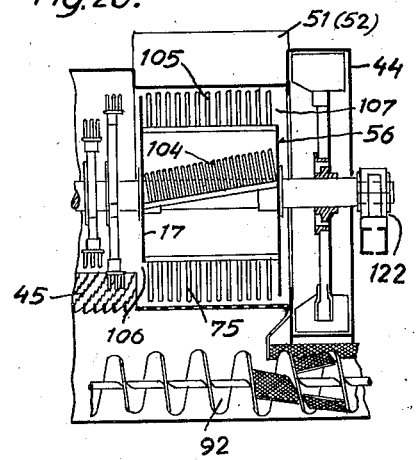
Fig. 26 is a vertical medial section through a further construction of a tossing and discharge chamber.

According to Fig. 26, tossing and outlet chambers are combined. The rakes passing through the chambers are constructed for purposes of tossing and stirring. The tossing rakes 104 are set for propulsion and have their prongs close together and bent rearwardly, whilst the stirring rakes 105 have their prongs radial and wider apart but not set for propulsion. In the rotating obstructing disc 17 there are located at diametrical positions straw inlets 106 which are of annular disc shape and which lie in the direction of rotation of the disc in front of the tossing scoops 104 and extend approximately to the stirring rakes 105, whilst similarly formed straw outlets 107, in the disc 56 arranged in front of the blower 44, start from the stirring rakes and extend in the direction of rotation of the disc up to the tossing scoops. Recesses 51 and 52, which correspond essentially to the recesses hereinbefore described, again start from the top chamber walls.

Figure 28:
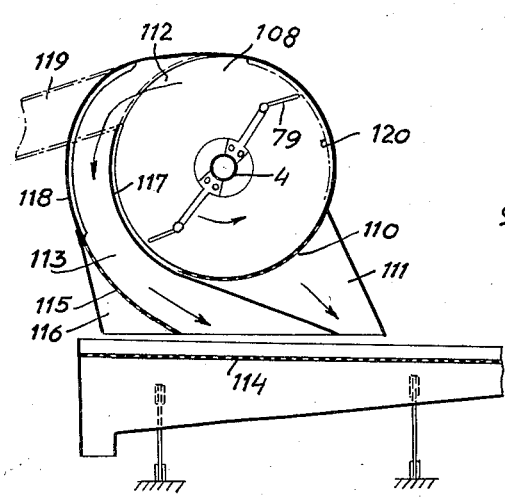
Figs. 27 and 28 are respectively a longitudinal section and cross-section through a different construction of a grain separating device.
Figure 27:
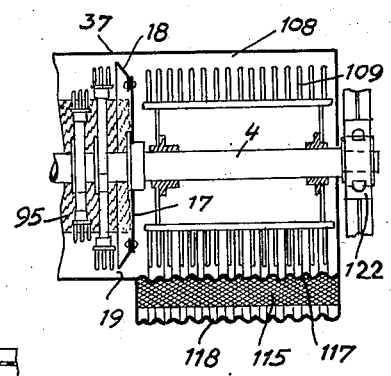

In the case of the construction represented in Figs. 27 and 28, there is located at the outlet end 45 of the working cylinder 37 a chamber 108 of considerable length in which work rearwardly bent stirring or tossing members 109 which are secured to the shaft 4. 110 is a sieve which is arranged in the bottom part of the chamber wall and to which a corn outlet 111 is connected. 112 denotes a longitudinal slot in the chamber wall which serves for discharging the straw and starts at a certain distance from the obstructing disc 17 and with which there is connected a channel 113 that leads the straw on to the rear end of a shaking sieve 114 on to the front end of which the channel 111 may open. The outer wall of the channel 113 has a sieve 115 and, behind it, a collecting chamber 116, from which the grains are led off in a suitable manner.

The wall portions 117 and 118 located in the direction of rotation of the material in front of the sieves 110 and 115 are corrugated with corrugations arranged transversely to the machine axis. If the channel 119, shown in broken lines, serves as straw outlet, the corrugations associated therewith are arranged on the wall portion 120, as shown in broken lines. If desired, the sieves 110 and 115 may also be corrugated, their corrugations likewise running transversely to the machine axis. 18 again denotes the inclined face which serves for the purpose of returning grains, bouncing against the obstructing plate 17, to the interior of the machine.

In the different constructions, the shaft 4 is hollow and mounted outside all the working zones at 121 and 122, thus producing the advantage that no bearing supports disturb the movement of the material being threshed.

The machine, according to Figs. 13 to 24, operates as follows:—

The grain fed in at 10 is seized by the beaters 5 and is carried in helicoidal circulation axially to the annular outlet space 19. During the passage through the machine, there is effected consecutively, between the members 35 and 36 a threshing, a threshing and preliminary reduction, and finally, substantially only a reduction, a softening of the straw also taking place in all the stages of the treatment. The reducing action is diminished if the tearing members, represented in the rear part of the working cylinder, are replaced by threshing or softening members, or entirely omitted. The threshed corn passes through the sieve 13 with short straw particles.

In the case of the construction according to Figs. 13 and 14, the comminuted straw passes from the annular space 19 directly into the first tossing chamber, from which it is tossed by the rakes 49 in small quantities into the recesses 51 and 52 and is spread out in the longitudinal direction of the machine on the sieves 53 and 54 in thin wide layers. This means a deflection of the straw from the circulation and a greater or smaller reduction of its movement, with the result that, by the change of direction and velocity, the grains are separated from the lighter straw, owing to the action of centrifugal force, and are separated off through the sieve. The quantities to be supplied to the separate recesses can be regulated within certain limits by means of the wall strips 48.

In the case of the example represented in Fig. 15, the bulk of the material is, on account of the partial shutting off of the annular space 19, thrown against the conical inclined face 21, the conditions being so chosen that the working wind carries the straw parts into the tossing chamber 41, whilst grains remain behind owing to the insufficient strength of the wind and are discharged through the opening 124 to the casing 91. The separating operation is assisted by the fact that the heavy grains, which are, preferably, located in the portion of the rotating material that lies on the working cylinder, are carried by the wall 125 from the top half of the machine to the inclined face, 123.

The straw, pressed rearwardly by the racks 49 set for propulsion, flows, while giving off more grains, to the second tossing chamber 42, where it again falls into the circulation. From this, it is again tossed into the recesses 51 and 52 and thence over the steps 60 and 61 into the chamber 43, where the differently set fingers 64 have the function of thoroughly stirring the quantities of straw that have fallen on the sieve 59 for the purpose of separating off the last grains, and then to push them to the blower 44.

The separation of grain and straw in the recesses can be enhanced by pneumatic or mechanical means or both, either by introducing compressed air into the recesses or by arranging stirring devices 89 and 90 therein. The compressed air especially prevents a too great passage of small straw through the sieve surfaces. In the recesses 78 represented in Fig. 16, the separation of the grains from the material thrown thereinto is effected similarly.

The material being winnowed, separated through the sieve openings 13 from the working cylinder 37, the recesses 78, 51 and 52 and the chambers 42 and 43, falls on the inside of the casing 91 which leads it to the worm 92. This conveys the material to the rear end, when it passes the awning device 93, 94 and is freed from grains and husks. In the preliminary winnowing device, the worm scoops 97 throw the material over the surface 96, by which means it comes into the compressed-air-suction-air-current of the pipes 88 and 83 (Fig. 24). The small heaps of grain thrown up are raked up and the light portions still admixed therewith are carried away by the suction air current to the blower 44, by which they are discharged, either together with the straw or separately therefrom.

By shifting the plate 99 there can be obtained in the worm 92 a certain obstruction of the grains and, consequently, their longer treatment in the awning device and in the preliminary winnowing device. After leaving the preliminary winnowing device 84, the material being winnowed arrives in a lifting mechanism 100, from which it is either removed or led into a second winnowing device 101. The light parts separated off in the second winnowing fall into a channel 102 connected to the straw-discharging device.

In the construction shown in Fig. 21, the straw is sucked through the channel 76 from the opening 75. Stirring fingers may be provided for assisting the suction. In the combined tossing and outlet chamber, according to Fig. 26, the entering straw is seized by the tossing rakes 104 and tossed in small quantities into the recesses 51 and 52. As soon as it leaves these a stirring is effected by means of the rakes 105, whereupon it again arrives in the recesses and from these again in the chamber. This operation is repeated until the material passes at the end of the chamber through the outlets 107 into the blower. The grains separate from the straw in the recesses on account of the deflection of the stream of material from the circulation. More grains are, further, discharged through the sieve openings of the chamber casing.

In the case of the construction according to Figs. 27 and 28, the straw is tossed around in thin layers on the inner periphery of the chamber wall by the members 109, the heavy grains being forced outwards and issuing through the sieve 110. A further treatment of the straw takes place in the curved discharge channel 113, in which the material is deflected from the circulation, by which means the rest of the grains is caused to be separated by sieve 115. The corrugation of the wall portions has the object of catching the grains and leading them to the sieves which may, if required, be corrugated.

In the case of the construction of the machine represented in Fig. 29 for the after-treatment of the short straw, there are arranged crosswise, behind the outlet of the threshing or straw-reducing machine constructed, for example, in accordance with Figs. 1 to 12, in a chamber on the shaft 4, two pairs of stirring rakes 126 which work above a sieve 59. The chamber is separated from the blower 44, which may be constructed as hereinbefore described, at the top by a radial wall 67 and, at the bottom, by an inclined face 21. Such a face is also present at the end of the threshing or straw-reducing machine. The vanes 69 of the blower conform to the inclination of the inclined face 21. By means of the rakes 126, the short straw to be treated is thinly spread out in the axial direction and well sifted, the recovery of the grains being collectively assisted by the inclined faces 21.

The process for winnowing grain, which further forms the subject matter of the invention, consists in that, on its way to the cleaning device or sacking position through the conveying device, e. g., a worm, it is thrown transversely through a current (suction) of air against a wall, which effects a braking or stoppage of the movement, whilst the light parts are carried along by the current of air. A device for enabling this process to be carried out consists, for example, of a conveying worm which is provided with tossing scoops and on which there is set laterally a container which serves as a continuation of an air suction pipe and in which bouncing walls and, if required, returning walls for the grains that are moved by the current of air and are again to be returned to the worm.

In Figs. 30 to 33, 92 denotes a worm with tossing plates 97. 127 is the lateral separating chamber which, in the beginning portion, forms a suction air pipe 128. At the air-admitting position there is located a regulating device 129—e. g., a rotary slide. The chamber is elongated and lies parallel to the worm 92, with which it communicates through a wall slot 130. The chamber wall located opposite the slot 130 is connected at the top to the worm casing with a curvature, and at the bottom to the worm casing with an inclination which ensures the sliding back of the grains. The inclined face 132 arranged below the air outlet 131 likewise serves for returning the grains. In other details the apparatus agrees with the construction represented in Figs. 14 and 24.

The material being winnowed is thrown out laterally by the worm plate 97 and thrown against the roof of the chamber 127 on which it bounces and its movement is stopped. The light parts are carried away by the wind. The carrying away occurs especially when the material loses its velocity by bouncing against the roof, where the air draught is greatest. After the reversal of movement, the grains are again washed and winnowed by the air and they then flow back into the worm on the steep return bottom. There is no ejection gap in the region of the opening 131. The winnowing device is made so long, in accordance with the degree of impurity, that the grains are, during their axial movement, thrown one or more times into the current of air which may also be a compressed air current. The winnowed grain can be conveyed further by a bucket conveyer 100.

In order to simplify the form of machine casing 1 represented in Figs. 1 to 33, the top portion of the casing lying in front of the descending beating members 6 is allowed to pass behind the summit of the enlargement 14 with a slightly re-entrant curvature 1b into the cylindrical portion of the casing. In this case, in the threshing zone II, the threshing ledge 16a is provided with a suitably inclined running—on surface and is arranged somewhat below the inlet position of the annular space 1c which is formed by the cylindrical portion of the casing lying below the curvature with the beating members. Experiments have shown that, in the case of this new construction, the return of the material being threshed into the zone of the beaters proceeds more advantageously than in the case of the aforementioned form of the casing. In certain circumstances the threshing ledge 16a may be provided higher up—it may be directly in or in front of the inlet position of the annular space 1c. The curvature takes up the throwing pressure of the arrowing straw, guides it back to the beater circle and gives it up to the beaters 6 only in such quantities that an undisturbed treatment takes place.

The new form of casing is to be found in the reducing zone III, where the curvature 1b of the casing likewise has the function of intercepting the straw arriving spread out in the helical direction and to give it up distributed to the tearing members 26 and 27. To this end, the first row $a$ of the stationary knives 27 is arranged at some distance below the point at which the slightly re-entrant curvature 1b joins the cylindrical portion of the casing. On its way to the row of knives $a$ the material to be reduced will be further distributed (Fig. 38).

In order to stiffen the casing, it is advisable to provide in the summit of the machine a wall strip 1d, (Fig. 37) serving as a bridge, running from the front end of the machine to the rear end. Between this strip and the bottom portion of the casing there are located the hinged or movable upper side portions 1 of the casing.

In order that, for the purpose of better, sifting, the material being threshed should remain for a fairly long time in the threshing and reducing portion individual beating members 6 are intermittently not given an oblique position such as to force the material being threshed to the outlet end, but a straight position. In certain circumstances it may be necessary to turn the working surfaces of the members towards the front end of the machine. In Fig. 35 of the drawings, where six series of beaters are, for example, employed in the inlet zone I the plates 6 of the second to the fourth series of beaters are set straight.

The row of pins 25, which is arranged transversely to the machine axis on the inside of the casing, especially between the reversing position of the grain and the bottom sieve 13, is located, in accordance with Figs. 35 and 36, also in the plane of the back boundary of the inlet position 10—i. e., approximately in the plane of the radial wall 12. The result of this is that the material being threshed is positively carried over the sieve of the inlet zone I and sifted off. Instead of a row of pins, a strip of plate 25a (Fig. 37) can be employed at this and other places.

In order to improve the sifting action of the inclined faces 21 arranged transversely to the longitudinal direction of the machine, the inclined faces 21 are, according to Figs. 39 and 40, made corrugated or provided in some other suitable manner with elevations and depressions in order that the arriving material being winnowed should move away over the elevations 21a and give the grains up to the depressions 21b, which may be provided with outlet openings 21c. According to the example, the corrugations extend in the longitudinal direction of the machine and thus lie transversely to the helicoidal direction of movement of the material being winnowed.

It is further proposed to arrange in the inlet of the straw-blower 44 a device by means of which the suction action of the blower, and, consequently, the quantity of the straw flowing away, are directly influenced (Fig. 35). The device consists for example, of a circular disc 137, which is stationary, or rotates with the shaft 4, in front of the inlet opening 138, bounded by the blower walls 21 and 67. The rim 139 of the disc is set obliquely. In general, its larger diameter is located on the straw-feeding side of the disc. By shifting the axis of the disc 137 or by changing its rim 139 for one of another diameter, considerable regulation effects can be obtained owing to the alteration of the width of the opening 138.

The disc 137 may be regarded as a means for shifting the suction of the blower from the centre of the suction opening to the edge region. The covering of the centre has the advantage that the air must flow through the edge region, where the straw is to be found, so that the latter is then positively carried along.

To the disc 137, for example, on the rim 139, there may be secured members, such as fingers, rakes and plates (indicated by broken lines) which are set for propulsion, and which serve for discharging the straw. These discharging means, in certain circumstances, make a pair of the rakes 126, used in the straw-treating portion IV, unnecessary.

Since the straw, on brisk threshing, fills up the blower chamber, the presence of sufficient quantities of air for a satisfactory working of the blower 44 is important, and the latter is provided with a device for the, preferably, regulatable admission of additional air, so-called supplementary air. The device consists, for example, of an opening which is arranged in the centre of the rear wall of the blower and whose width can be regulated by means of slides 140a or the like.

The wind conditions in the chamber 141 provided for the after-treatment of the straw may be improved by letting out air therefrom at the periphery of the casing by, for example, connecting a pipe 142 to an opening in the periphery of the casing and leading it to or into the inlet 140 of the casing 44. By fitting slides or other devices the quantity of the air to be taken from the chamber 141 can be regulated. The air-tapping device may also be provided on the threshing and reducing portion. The tapped-off air may also be passed into any existing chaff blower, such as 144.

Figure 34:
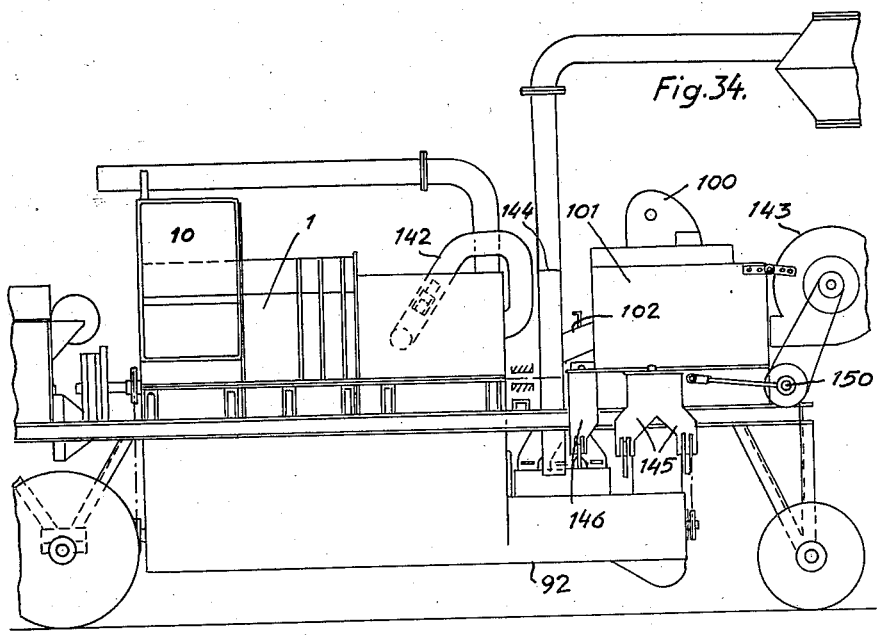
Fig. 34 is a side view of another construction of the threshing and reducing machine and Fig. 35 is partly a view on the other side and partly a vertical, longitudinal medial section.

The winnowing device, for winnowing the grains, fitted to the rear end of the machine and provided with blowers, lies in the axial direction of the machine. This has the advantage that the shaking movements of the sieve take place in the longitudinal direction of the machine, by which means the machine frame is much less strained than in the case of a transverse position of the moving parts of a winnowing device. In Figs. 34 and 35, 101 denotes the winnowing mechanism, the blower 143 of which can be opened upwards in order to change the sieve and to shorten the length of the machine on transport. The waste wind of the winnowing mechanism is passed through a short channel 102 into a chaff blower 144, or, if that is absent, into the straw blower 44. The arrangement has the advantage that an improved grain winnowing is produced and the development of dust is reduced by the suction action of the blower connected behind the winnowing mechanism. When the waste air of the winnowing mechanism is passed into the straw discharge blower 44, it, at the same time, represents supplementary air for the latter.

100 is an elevator which delivers the preliminarily dressed grains to the winnowing device 101. 145 are grain outlets which are used alternately. 146 is an outlet for knots and straw particles which are fed from the winnowing sieve through a channel 147 to the outlet (Fig. 41). The bottom of the channel consists partly of a sieve beneath which a chute 148 is arranged through which the grains freed from knots and straw particles, are delivered to the elevator 100. The elevator 100, the blower 143 of the winnowing device, and the shaft 150 operating the sieves, receive motion through the medium of a conical gear from the screw conveyer 92 arranged under the machine. If necessary, shutters or the like may be provided for regulating the effect of the blower on the winnowing device.

For the separation of foreign matter from the grains, a device may be employed which consists of a conical or inclined cylindrical rotary drum 152 provided with buckets 151 (Fig. 42). At one end of this drum air is admitted together with materials, the other end of the drum being provided with outlets for knots or the like as well as for the air laden with straw particles. The air outlet is arranged on the straw delivery blower 44. An air blast of sufficient strength is passed through the drum 152 the buckets 151 of which scoop up the materials and then let them fall through the air current which carries the lighter particles away. The grains pass towards the end of the drum and fall through the sieve situated therein. Suitable regulating devices allow the effect of the air blast to be varied.

The preliminary winnowing device 127 shown in Figs. 30–33 has been improved in various essential respects. Instead of a single air outlet at the end of the separating chamber, two or more outlet openings 131 are provided on the main portion of the chamber, each opening being thus exposed to a much restricted part of the entire suction. The suction pipes 128a communicate with the chaff blower 144 and are provided with shutters 153 or the like through which fresh air is admitted. Inclined plates 154 may be arranged between the air outlets 131 for guiding the air. If no chaff blower is present, the suction pipes 128a, which may branch off from the main conduit, may be connected to the straw blower 44.

The preliminary separating chamber 127 can also be employed as a hummeling device, it being for this purpose lined with a friction netting 154a indicated dotted in Fig. 41. The awns will be caught in the netting when the materials are hurled against it. The rough inner surface of the chamber also facilitates the removal of the lighter particles which, owing to the slow return drop of the materials will be exposed longer to the air current.

The separating chamber is provided at each end with air inlets 129 which can be regulated by means of flap valves or the like. The opposite wall of the screw conveyer 92 may be provided with similar inlets. In the principal wall 127a, opposite the openings 131, further inlets 156 for fresh air are provided, and these may be controlled by sliding shutters 155 or the like. To collect grains which may be thrown through the air inlets, covering plates 157 are carried upwards and outwards from the lower edges of the inlets. As an alternative the inlets may be covered with sieves to prevent the grains from being thrown. The separating chamber may, if necessary, be provided with a stirring device.

The tossing and conveying screw 92 is also improved in that the tossing plates 97 are omitted in the spaces situated opposite the openings 131. The effect of this is that the materials will be thrown off only between the suction points 131, and are allowed to return in the neighbourhood of the latter. This prevents the grains from being carried away by the air current.

In contradistinction to known axial threshing machines wherein the annular space surrounding the revolving elements is largest in the inlet zone of the machine and gets smaller towards the discharge end, the space between the revolving beaters and the machine casing or the threshing ledges is, according to one embodiment of the invention, enlarged towards the discharge end. For this purpose the diameter of the machine casing may be enlarged towards the discharge end. The casing may either be conical or formed from cylindrical sections of different diameters. This construction has the advantage that the frictional and speed resistance, and thus the power consumption, will be lessened. This form of the machine is particularly suitable for delivering litter straw since wide passages are required for the smooth discharge of the materials. The invention is closely concerned with the retraction of the materials from the beater path since thereby a good distribution of the materials can be obtained.

Figure 43:
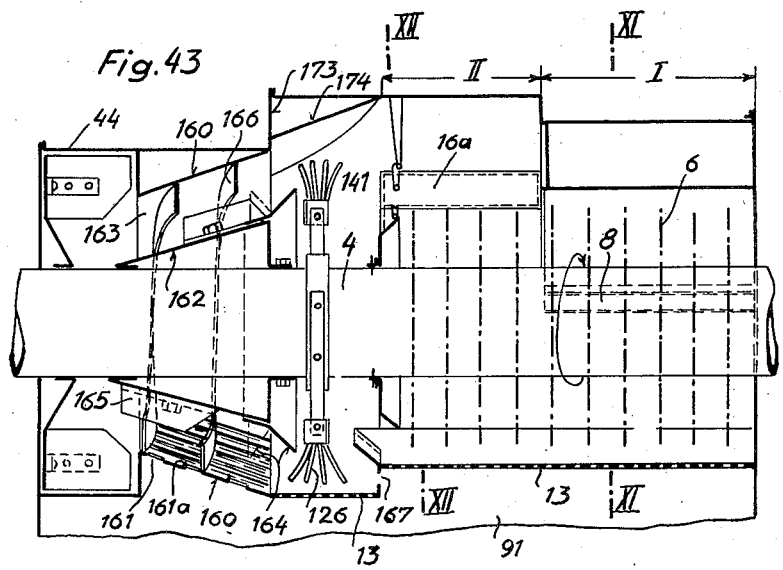
Fig. 43 is a vertical, longitudinal medial section of a different construction of an axial threshing machine.
Figure 44:
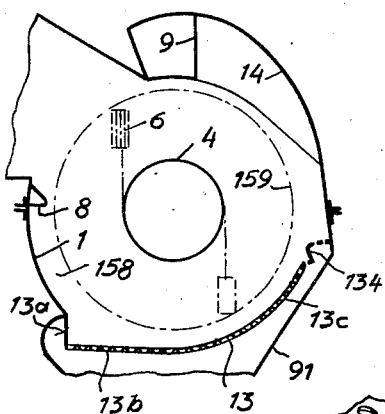
Fig. 44 is a section on the line XI—XI of Fig. 43.
Figure 45:
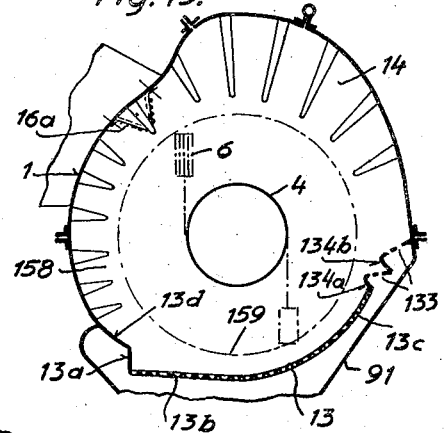
Fig. 45 is a section on the line XII—XII of Fig. 43.

It is evident from Figs. 43-45 that, while the revolving members 6 are of equal length, the space 158 between these members, i. e., between the beater path 159, and the casing wall under the ledges 8, 16a, is smaller in the inlet zone I than in the threshing zone II. The eccentric enlargement 14 is also smaller in the inlet zone I than in the threshing zone II. Sometimes it may be advisable to make the enlargement 14 of the zone I of the same size as that of the threshing zone II, since the guide member 9 in the enlargement of the zone I fills the latter to a great extent.

The sieve 13 which forms the bottom of the casing 1 and which may consist of a bar grate, is arranged at a considerable distance from the beater path 159 and connected to the casing 1 at the forward end by a dropping step 13a. The forward portion is essentially flat and extends to the vertical central plane of the machine. From here the rear portion 13c is carried at a uniform distance from the beater path to the neighbourhood of the central horizontal plane and is then rejoined to the casing 1 by means of a device which will be described later.

In the widened threshing zone II the path 13d of the casing just in front of the step 13a, is turned towards the beater path and serves as a guide surface for the material thrown on to the sieve. The step enhances the sifting which can be still further promoted by the provision, between the ledges 8, 16 at the inside of the casing, of corrugations arranged transversely of the axis of the machine. The large gap between the sieves and the beater path 159 allows an easy transport of the rather long straw and has the further advantage of reducing and unifying the power consumption.

In the machine according to Figs. 1-4 the trailing side of the sieve 13 is recessed to form a pocket wherein, by centrifugal action, a separation of grain and straw is effected. According to the modification, the recesses are replaced by projections. Fig. 44 shows the sieve part 13c of the inlet zone I provided with a projection 134. Fig. 45, which represents the threshing zone II, shows the sieve part 13c provided with two projections 134a and 134b. The upper wall of the projections 134, 134a are substantially horizontal while the upper wall of the larger projection 134b is inclined towards the interior of the machine for the discharge of straw particles, husks and the like. In the dead spaces between the projections and between the latter and the sieve 13 and the casing 1, the grains will be collected and discharged through numerous openings 133. Projections of this kind can also be employed in the zones III and IV of the threshing and straw reducing machine.

Figure 46:
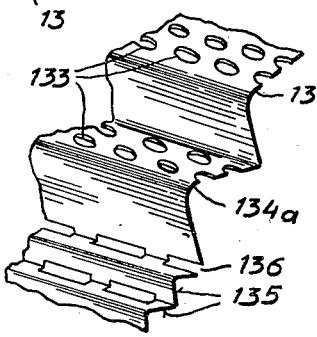
Fig. 46 is a perspective view of a detail.

The sieves 13 consist of angle bars 135, and alternate bars form between them and the adjacent bars slots 136 (Fig. 46) through which the grain can be discharged and the air admitted. The slots are formed by an equal notching of both bars of the pair and therefore appear in symmetrical arrangement in the valleys.

In order to prevent the grains from being returned to the casing by a too strong air suction, plates 91 are arranged under the sieves and sufficiently close to the latter to throttle the air and lead it through the sieves without effecting the grain discharge. These throttling plates which may be adjustable, are mostly arranged under the trailing parts of the sieves 13. The plates 91 may conveniently be combined with the gutter accommodating the screw conveyer as shown in Fig. 36.

The threshing ledge 16a is arranged closer to the beater path 159 than the ledge 8. It is preferable to make it adjustable relative to the beaters 6 or to connect it to the casing by means of screws allowing it to be readily exchanged for regulating the gap between the ledge and the beaters. A narrow gap promotes the degraining, softening and tearing of the straw. A wider gap may be used for materials such as peas, beans and the like, without any change in the speed of the beaters, which is of importance when the machine is directly coupled to the driving shaft.

It is also advisable to roughen the working surfaces of the ledges 8, 16a, which may be done by a corresponding shaping of the surfaces or by covering the latter, as shown in Fig. 45, with the wire netting. The degraining of the materials is enhanced in this manner. Thus the gap between the beaters and the ledges may be enlarged to provide an easy passage for the materials, while at the same time efficient threshing may be obtained by roughening the working surfaces of the ledges. The top surface of a small threshing ledge may be provided, like a rake, with fingers 16b arranged so as to project close to the beater path as shown in Fig. 37. This arrangement also ensures a good threshing effect.

The straw which arrives in the machine in comparatively straight and compact condition will, after having been beaten against the threshing ledge 8 and whilst moving through the annular slit 158 and over the sieve 13 into the enlargement 14, assume an entangled mass, and the bulk of the straw will therefore be increased considerably as it enters the zone II. The latter enables this bulk to be treated without hindrance. As the material leaves the space 158 and falls on to the sieves 13, the grain gets discharged and falls through the sieve 13b while the remaining materials pass on. A further degraining of the material takes place as it passes over the abutments 134, 134a and 134b.

Behind the threshing zone II there is a straw collecting chamber 141. The inclined surface 160 situated between this chamber and the blower 44 is long and flat. It develops in the upper half of the machine into a closed annular surface. The lower part thereof is either corrugated across the helical path of the straw or provided with projections and recesses. The valleys of the corrugations are provided with grain outlets 161. The advantage of this lengthened inclined surface is that a more complete degraining of litter straw will take place.

Fig. 47 shows a modification wherein the entire lower part of the conical surface 160 is rendered serviceable for sifting purposes by the provision thereon of corrugations arranged transversely of the machine shaft 4. The valleys of the corrugations are provided with grain outlets 161 which are protected by lugs 161a directed inwards towards the shaft. Such lugs are also present in the arrangement shown in Fig. 43. The lugs are intended to prevent the grains from being carried away with the straw. In case of need additional, longitudinally arranged sifting gutters may be arranged in a lower position.

The conical surface 160 may, in combination with a cone 162, arranged on the machine shaft 4, form an annular channel 163 which tapers uniformly from the chamber 141 towards the blower 44. This channel, which opens into the suction zone of the blower, produces, owing to its form and position, a stream-line guide for the straw on its movement from the threshing zone II through the chamber 141 into the blower 44, since the action of the latter is relegated principally to the outlet of the threshing space. The air from the threshing space mixes with the air sucked in by the blower. The width of the annular chamber 163 may be regulated by an axial adjustment of the cone 162 or by a radial adjustment of the conical surfaces. As an alternative the cone may be held stationary by means of arms connected to the machine casing.

The cone 162 possesses, at the end facing the space 141, an inclined rim 164, the function of which is to admit the straw more or less rapidly to the blower according to its nature. In the case of dry short straw the larger diameter of the exchangeable rim is arranged to face the straw chamber 141. When the straw is long and moist the rim is arranged to face the blower 44 as shown dotted (Fig. 43). The inclined rim produces a narrowing of the inlet to the annular space 163 and thus an increase in the velocity of the air current which carries the straw.

Arranged opposite and staggered relative to each other on the casing 162, are two propelling members 165 (Fig. 43) in the form of vanes, forks or the like whereby the feeding of the straw through the annular channel 163 is promoted. These members are adjustable for regulating the propelling effect. If they are in the form of vanes, they will have the additional function of feeding air to the blower 44.

To prevent the straw from being delivered through the channel 163 to the blower without sufficient sifting, means may be provided in the channel to compel the straw to move over the corrugated sieve 160. Such means may consist of guide plates 166 carried in the direction of the helical movement of the material. These plates may have their leading edges situated behind the corrugated sieve in the horizontal median plane and may be carried from this position over the upper part of the surface 160 and terminate at the lower crest of the sieve. The plates 166 may reach radially more or less close to the members 165. The members 165 and 166 may be adapted to operate independently of each other instead of in co-operation, for instance by connecting the plates 166 to the cone 162 and omitting the vanes 165.

A further novelty consists in that the gutter 91 which contains the conveying screw 92 and which collects the grains falling through the sieve 13, communicates through an adjustable slit 167 (Fig. 43) with the straw chamber 141 and with the blower 44 through the annular channel 163. By this arrangement the sieve 13 will be found to function more satisfactorily since the straw will be carried away rapidly by the air current and prevent a stoppage. A further advantage is that the action of the blower 44 on the threshing space will be reduced and that the air suction from under the sieve of the threshing space will carry considerable quantities of foreign matter from the conveyer gutter and thus produce a preliminary winnowing effect. Moreover, as the air pressure under the sieve will be reduced, the discharge of the grains will be facilitated.

According to Fig. 43 the upper part of the straw chamber 141 is flush with the threshing zone II. Since the annular channel 163 has a smaller diameter, a step 173 will be formed in the chamber 141 and this step is partly covered by an inclined plate 174 which thus ensures at this place a rapid discharge of the straw.

The novel machine with increased distance between the rigid and revolving parts for the promotion of an undisturbed and uniform motion of the materials, requires, owing to the quicker motion of the materials, means to effect an equally rapid softening, reduction and degraining of the straw.

Such means consist in the interposition and practical utilization of the straw collecting chamber 141 between the long inclined surface and the principal threshing zone. In the straw chamber, the sieve of which is placed farther from the shaft owing to the widening of the machine casing, rigid and revolving members are arranged by means of which, according to given conditions, an after threshing, softening, tearing or other action on the straw can be effected. A further advantage of this chamber consists in that it can be utilized as a means for distributing irregularly arriving masses of straw and effecting a uniform discharge thereof.

According to Fig. 47 the chamber 141 situated in front of the inclined surface 160 serves as a supplementary threshing chamber. The revolving threshing members in this chamber consist of oppositely arranged, broad threshing plates which are inclined for propelling effect and connected to arms or tool carriers 5 on the shaft 4. The diameter of the circular path of the threshing plates is greater than that of the plates 6 in the zones I and II of the machine. The threshing plates co-operate with one or more threshing ledges.

A supplementary threshing outside the zone II behind a disc 17, is used for material, the grains of which are difficult to dislodge. The plates 175 produce air currents which tend to drive the straw through the annular space 163, the delivery being facilitated by the stream-line arrangement of the latter.

For the delivery of slightly reduced straw, the work is done with the beater plates 175 and the threshing ledge or ledges 16a. For the production of short straw, the plates 175 are replaced by knives or other cutting or tearing elements 26 (shown dotted in Fig. 15) which pass between long cutting members 27 such as fingers or saw blades connected to the machine casing. These elements may be multiplied in order to obtain very short straw.

For softening the more or less reduced straw, the upper part of the chamber 141 may be provided with a plurality of longitudinally arranged, roughened angular bodies 176 (Fig. 48) against which the straw is hurled. Means may be provided for regulating the intensity of the treatment. By arranging these bodies across the direction of movement of the straw, the latter will be checked and acted upon by the beaters 175 for softening purposes. The softening process can be enhanced by maintaining the ends 177 of the bodies 175 in a retracted position relative to the beaters (Fig. 48).

Another method of softening and reducing the straw consists in treating it in inclined guide channels to a combined tossing and more or less intense mechanical pressing action. A supplementary threshing will also be effected in this manner. In Figs. 49-51 such channels are produced by means of inclined plates 178 which are arranged between the parts 1b of the machine casing and the grate bars 13 of the straw chamber 141 and which can also be arranged at the opposite side of the machine casing. The plates are preferably provided with projecting ribs 179, opposing ribs in a channel being relatively staggered in the circumferential direction. The channels are made more or less wide according to whether unreduced or prereduced straw is being treated. The inner portions of the channels are flared. If the straw is to be made very soft, beaters 180 which taper towards the free ends may be made to work in the channels in close proximity to the ribs 179. The beaters may be provided with V-shaped projections on their active surfaces. If less soft straw is required, the beaters may be made shorter or otherwise modified in shape to reduce their mechanical action on the straw.

The straw is caught by the beaters 180, thrown into the channels 178 and moved along the latter while it is being softened and reduced by impact, pressure and friction. The grains still retained in the straw fall to the bottoms of the channels and pass freely along the latter to the bottom sieve.

To enable the machine to be easily adjusted for supplementary threshing, softening and tearing of the straw, the working members in the chamber 141 are made detachable. The chamber may also be used as described when a straw reducing zone is arranged between it and the threshing zone II.

It is also possible to adjoin the long annular surface 160, with or without ribs and revolving members and by omitting the chamber 141, to the threshing and straw reducing machine proper. In this case the diameter of the annular surface 160 should be greater at the inlet side than that of the threshing and straw reducing machine. In the thus stepped-off machine portion air inlets are provided either in the lower path thereof or distributed over the entire circumference. These inlets may be adjustable. In this manner the straw will be readily sucked from the space 163 without the blower 44 drawing its air supply only from the threshing or straw reducing zone.

Instead of the blower 44, a straw discharging device 181 such as shown in Figs. 47 to 52 may be employed. This device comprises a blower fitted with an outlet pipe 182 arranged as far as possible behind the crest, and revolving tossing members 183 arranged on the machine shaft 4. The outlet pipe can as an alternative take the form shown by dotted lines. The straw delivery device may be employed in all the hereinbefore described constructions of the threshing and straw reducing machine.

I claim:

1. A threshing and straw reducing machine of the character described, comprising a casing having a beater shaft in said casing, a threshing zone, a straw delivery blower at the discharge end of the casing, beaters on said shaft throughout said zone, a sieve forming the bottom part of the casing through said zone, a chamber between said zone and the blower, and an inclined conical surface directed towards the blower and forming the wall of said chamber, the conical surface being corrugated and discharge openings for the grains are provided in the valleys of the corrugations.

2. A threshing and straw-reducing machine of the character described, comprising a casing, a beater shaft in said casing, a straw delivery blower at the discharge end of the casing, a sieve forming the bottom part of the casing, and an inclined conical surface leading from the sieve towards the blower, in combination with a cone mounted on the shaft over said conical surface adapted to form between it and the latter an inclined straw passage.

3. A threshing and straw-reducing machine of the character described, comprising a casing, a beater shaft in said casing, a straw delivery blower at the discharge end of the casing, a sieve forming the bottom part of the casing, and an inclined conical surface leading from the sieve towards the blower, in combination with a cone mounted on the shaft over the conical surface adapted to form an inclined straw passage directed towards the effective portion of the blower.

4. A threshing and straw-reducing machine of the character described, comprising a casing, a beater shaft in said casing, a straw delivery blower at the discharge end of the casing, a sieve forming the bottom part of the casing, and an inclined conical surface leading from the sieve towards the blower, in combination with a cone mounted on the shaft over the conical surface adapted to form an inclined passage directed towards the effective portion of the blower, and an adjustable rim on the cone for regulating the inlet of said passage.

5. A machine as claimed in claim 2 wherein the inclined conical surface is formed with sifting apertures and guiding means for leading the straw positively over said sifting apertures.

6. A threshing and straw reducing machine of the character described, comprising a casing having a beater shaft in said casing, a threshing zone, a straw delivery blower at the discharge end of the casing, beaters on said shaft throughout said zone, a sieve forming the bottom part of the casing through said zone, a chamber between said zone and the blower, and an inclined conical surface directed towards the blower and forming the wall of said chamber, with a straw distributing chamber of enlarged diameter arranged between the inclined conical surface and the forward portion of the machine, revolving, threshing and softening members arranged on the machine shaft in said chamber, the chamber being formed with inclined guide channels which co-operate with the revolving members.

7. In an axial threshing machine, a casing drum, a rotating element, beaters thereon, means including said beaters for conveying the materials through a predetermined helical path through the machine, an intake for positively feeding the materials to the beaters for an initial acceleration and beating action, said drum having one part at the intake end closely approaching the path of the beaters and another part aft of the intake gradually receding from the path of the beaters in the direction of movement to form a decelerating chamber above the beaters large enough in depth and width to accommodate a substantial part of the normal body of material fed to the beaters, the wall of the exit part of the chamber approaching the path of the beaters in a less gradual curve than that of the gradually receding part and deflecting the materials from the chamber back into the path of the beaters for re-acceleration, said chamber being long enough to cause repeated decelerations and accelerations of the material in its helical path through the threshing part of the machine, and the interior of the casing peripherally immediately in advance of the decelerating chamber being free of stationary beaters.

8. In an axial threshing machine, a casing drum, a rotating element, beaters thereon, means including said beaters for conveying the materials through a predetermined helical path through the machine, an intake for positively feeding the materials to the beaters for an initial acceleration and beating action, said drum having one part at the intake end closely approaching the path of the beaters and another part aft of the intake gradually receding from the path of the beaters in the direction of movement to form a decelerating chamber above the beaters large enough in depth and width to accommodate a substantial part of the normal body of material fed to the beaters, the wall of the exit part of the chamber approaching the path of the beaters in a less gradual curve than that of the gradually receding part and deflecting the materials from the chamber back into the path of the beaters for re-acceleration, and the interior of the casing peripherally immediately in advance of the decelerating chamber being free of stationary beaters.

9. A machine of the character set forth in claim 8 wherein the gradually receding part of the casing is shaped to permit the tangential travel of the material away from the beater path.

10. A machine of the character set forth in claim 8 wherein stationary threshing means is provided at the exit of the decelerating chamber and the casing wall below said stationary threshing means is spaced from the beater path.

11. In an axial threshing machine, a rotating element, beating conveyors thereon and a casing for said rotary element having adjacent the intake end one part closely approaching the path of the beaters and another part above said first named part gradually receding on one side from the path of the beaters in the direction of movement thereof to form a decelerating chamber above the beaters large enough in depth and width to accommodate the whole body of material capable of being handled by the machine, said second part of the casing in which the decelerating chamber wall is formed approaching the beaters on the exit side in a less gradual curve than that of the gradually receding part to facilitate re-introduction of the materials after deceleration into the beater path.

12. In a machine of the character set forth in claim 11 wherein the lower part of the casing closely approaches the path of the beating conveyors and the gradually receding part begins substantially on a line formed by a horizontal plane through the axis of the rotating element and is shaped to permit the tangential travel of the material away from the beater path.

13. An axial threshing machine, a rotating element with beating conveyors thereon, a casing for said rotating element, an intake whereby material to be threshed may be introduced into the path of the beating conveyors and accelerated to a high velocity thereby and including means permitting the whole body of said materials normally introduced to be subsequently automatically thrown out of the path of the beating conveyors, retarded and then re-enter the path thereof for a second acceleration by a continuous uninterrupted movement, the means permitting the materials to be thrown out of the path of the beating elements comprising an enlargement of the casing on the upper half thereof forming a decelerating chamber for the reception of the materials, said enlargement being non-symmetrical in planes at right angles to the axis of rotation and offering a frictional braking resistance to the travel of the materials to decelerate the same, the inlet side of the enlargement forming a chamber part of gradually increasing depth and the chamber terminating on opposite sides of a vertical axial plane through the machine with the exit side of the chamber disposed above the level of the inlet side.

14. An axial threshing machine, a rotating element with beating conveyors thereon, a casing for said rotating element, an intake whereby material to be threshed may be introduced into the path of the beating conveyors and accelerated to a high velocity thereby and including means permitting the whole body of said materials normally introduced to be subsequently automatically thrown out of the path of the beating conveyors, retarded and then re-enter the path thereof for a second acceleration by a continuous uninterrupted movement, the means permitting the materials to be thrown out of the path of the beating elements comprising an enlargement of the casing on the upper half thereof preceded by a smooth interior, said enlargement being non-symmetrical in planes at right angles to the axis of the machine with the curve thereof more sharply defined at the trailing side of the enlargement.

15. In an axial threshing machine, a rotating element with beating elements thereon, a casing for said rotating element, an intake whereby material to be threshed may be introduced into the path of the beating elements and accelerated to a high velocity thereby, a threshing ledge at said intake approaching the beater path, a bottom sieve, an enlargement adjacent the intake in the upper part of the casing which permits the body of the helically moved material to be automatically and wholly thrown out of the beater path in said enlargement to retard therein in free flight and to return to said path by its own weight, the interior surface of the enlargement being formed as a smooth wall for guiding the material during its movement through the enlargement, a threshing ledge following said enlargement and an arcuate space between each of the two ledges and the bottom sieve.

16. A threshing machine as set forth in claim 28 with sieves forming the bottom of the casing and with one or more comparatively low baffle walls arranged on the bottom sieves in planes at right angles to the beater shaft, adapted to oppose the helical and axial travel of the material.

17. An axial threshing and straw-reducing machine comprising a casing, a revolving beater shaft in said casing, and means on said casing adapted to deflect the materials from their circular course for the separation of the grains from the straw and means for leading off the separated grains, the casing being formed with a straw delivery chamber, vanes arranged on the shaft in a blower casing and forming a blower for the removal of straw from the chamber, and a partition co-operating with said blower to form two suction chambers having one pressure chamber in common.

18. An axial threshing machine of the character described, comprising a casing generally of cylindrical form, axially spaced inlet and outlet, a revolving shaft in said casing, and beaters on said shaft which together with the casing impart to the materials being threshed a helical movement through the machine, said beaters having a predetermined clearance at the intake between the beaters and the casing, the clearance between the ends of the beaters and the casing wall being enlarged towards the discharge end of the machine to provide a gradually increasing clearance space for the straw toward the outlet end of the machine.

19. A threshing and straw-reducing machine of the character described, comprising a casing having at the top an enlargement for the accommodation of material thrown clear of the beater path and having a bottom composed of a sieve, a revolving shaft in said casing, beaters on said shaft, and a nose-like projection at the trailing side of the sieve in advance of the enlargement, said projection extending radially inwards and forming a dead space thereabove which functions as a grain separation chamber.

20. In a machine of the character set forth in claim 19 wherein said projection is formed stepwise with the higher part adjoining the machine casing formed with a downward slope directed towards the interior of the machine.

21. In a machine of the character set forth in claim 19 wherein the projection comprises a sheet metal member angular in cross section and extending lengthwise of the machine, with the upper side having apertures for the escape of separated grain.

22. In a machine for threshing, carrying and softening straw comprising a casing, a threshing zone, a chamber following said threshing zone, guide channels with oblique walls in said chamber, relatively rotating members cooperating with said guide channels, said members being cone-shaped and means for rotating said members.

23. An axial threshing and straw-reducing machine of the character described, comprising a threshing chamber, sieves forming the bottom of said chamber, a blower arranged co-axially with the threshing chamber, a conical straw passage of enlarged annular cross-section leading from the threshing chamber to said blower, grain outlets in said conical passage, a screw conveyor arranged under the sieve to receive the grains from the latter, said conveyor being in communication with said conical passage, and a vertical wall separating the threshing chamber from the straw-collecting chamber, said wall being formed with slits forming air passages.

24. A threshing and straw-reducing machine of the character described, comprising a casing having a beater shaft in said casing, a threshing zone, a straw delivery blower at the discharge end of the casing, beaters on said shaft throughout said zone, a sieve forming the bottom part of the casing through said zone, a chamber between said zone and the blower, and an inclined conical surface leading from the sieve towards the blower and forming the wall of said chamber, the conical surface forming an annular channel and being characterized by the provision in the annular channel of revolving, preferably adjustable, conveying elements which influence the rate of movement of the straw and also that of the air according to their more or less angular positions, and further characterized by the provision in the annular channel of helically arranged guide walls which may co-operate with other elements.

25. A method of threshing grain in axial threshing machines, which consists in tangentially and completely withdrawing the whole body of straw material being threshed to the full normal capacity of the machine from and beyond the revolving threshing element at least once and during the ascending progress through the machine, retarding the movement of said materials while thus withdrawn and then returning the same by own weight during the descending movement for further treatment to said element, with a continuous uninterrupted circumferentially and positively guided movement during the withdrawing, retarding and returning movement.

26. The method of treating materials to be threshed which consists in introducing the materials into contact with the descending revolving elements of an axial machine, completely withdrawing the whole body of said materials normally introduced from contact with the ascending revolving beaters positively guiding the withdrawn materials in a circumferential way and retarding the same and again introducing the materials thus withdrawn, guided and retarded into the path of the descending revolving elements for reacceleration while causing the same to follow a generally helical path with a continuous uninterrupted movement.

27. The method according to claim 26 wherein the materials to be threshed are repeatedly withdrawn from contact with the revolving beaters, and reintroduced into their path.

28. An axial threshing machine, a casing with an intake and a discharge axially displaced from each other, a shaft in said casing with elements thereon for beating and helically moving the materials to be threshed from the intake toward the discharge, an enlargement in the upper part of the casing which permits substantially the whole body of the material to the normal capacity of the machine to be automatically and wholly thrown out of the path of the beating elements in said enlargement, to be retarded therein in free flight and to return to the beater path by its own weight, the wall of the enlargement on the intake side receding from the beater path in a generally tangential direction and thereby permitting the material to follow a generally tangential direction upon leaving the beater path and the interior surface of the enlargement forming a guiding wall for the material in its movement during at least the greater part of the free flight and return to the beater path.

29. An axial threshing machine, a casing with an intake and a discharge axially displaced from each other, a shaft in said casing with elements thereon for beating and helically moving the materials to be threshed from the intake toward the discharge, a longitudinal and circumferential enlargement in one part of the casing which permits the whole of the material to the normal capacity of the machine during its helical movement automatically and repeatedly first to be thrown out of the path of the beating elements in said enlargement, second to be retarded therein in free flight and third to be returned to the beater path for a new executed acceleration on the rest of the casing circumference, the wall of the enlargement on the intake side receding from the beater path in a generally tangential direction and thereby permitting the material to follow a generally tangential direction upon leaving the beater path and the interior surface of the enlargement having circumferentially disposed smooth areas for guiding the material during at least the greater part of its movement past the enlargement.

30. An axial threshing machine, a drum with an intake and a discharge axially displaced from each other, a shaft in said drum with elements thereon for beating and helically moving the threshing materials along the drum, a longitudinal and circumferential enlargement of such large size and shape in the upper part of the casing adjacent the intake that it permits the whole of the material to come automatically and repeatedly out of operative contact with the ascending elements, to decelerate in free flight in the direction of movement and re-enter the path of the descending elements for a new executed beating and acceleration on the remaining circumference of the drum, the enlargement being of a shape to permit the material to follow a generally tangential direction upon leaving the beater path and the interior surface of the enlargement forming a guiding wall for the material during at least the greater part of its movement past the enlargement and threshing ledges both below the intake and the place of re-entrance of the material.

31. An axial threshing machine comprising an elongated casing having an intake and an outlet which are axially spaced, a rotor having beater and conveyor elements axially and circumferentially arranged in co-operation with the casing to carry the materials in a helical path around the axis of the machine, said casing having in its upper part an elongated enlargement bridging at least two of the helical turns of the material, said enlargement permitting substantially the whole body of materials which are being helically conveyed to the full normal capacity of the machine to be thrown wholly out of the path of the beaters at each of the two helical turns through the zone embraced by the enlargement.

32. An axial threshing machine comprising a casing having an intake and an outlet which are axially spaced from each other, a rotor having beating and conveying elements axially and circumferentially arranged to convey the material in a helical path around the axis of the machine and an enlargement in the upper part of the casing circumferentially but unequally extending beyond both sides of a vertical axial plane through the machine and permitting substantially the whole body of the material being helically conveyed to be wholly withdrawn from the path of the beating and conveying elements by the action of centrifugal force, retarded within said enlargement and positively directed and guided back to the path of the beaters by the wall of said enlargement.

33. In a machine of the character set forth in claim 31 wherein the wall of the enlargement both at the leading and trailing sides is formed into gradual curves for permitting the free exit of the materials from the beater path under the influence of centrifugal force and the free re-entrance of the materials into the beater path at the trailing side, with the wall of the enlargement at the trailing side approaching the beater path at a point above the horizontal axial plane through the machine thereby permitting gravity to act upon the retarded material to return it to the beater path.

34. In an axial threshing machine, a casing having an intake and a discharge which are axially spaced from each other, a rotor having working members, and means whereby the material may be positively fed into the path of the conveying members at the intake and accelerated thereby, said casing having on its upper part a chamber outside of the beater path and axially spaced from the intake which permits substantially the whole body of the materials to the full normal capacity of the machine to be thrown entirely clear of the working members by centrifugal force, retarded in the chamber and then returned to the path of the working members by gravity and by the guiding action of the trailing part of the chamber wall, the chamber having circumferential guiding walls at the leading and trailing sides of different curvatures, with the curvatures of the leading side more gradual than that of the trailing side.

35. In a machine of the character set forth in claim 19 wherein the sieve is formed of mating angular members notched to form grain discharge apertures.

36. A machine of the character set forth in claim 11 wherein the part closely approaching the path of the beaters comprises a threshing ledge and the casing below said ledge is spaced from the beater path.

37. A machine of the character set forth in claim 11 wherein both the exit of the intake and that part of the casing closely approaching the path of the beaters embody each a threshing ledge and the casing below said ledges is spaced from the beater path.

38. A threshing machine as set forth in claim 30 wherein wall-like means are connected to the casing of the enlargement in a plane lying essentially at right angles with the beater shaft and projecting radially towards the beaters, adapted to oppose the helical and axial travel of the material.

39. An axial threshing machine having a threshing drum with an inlet at one end, a discharge at the other end, a beater shaft in said drum having beaters arranged thereon to convey the materials helically through the machine and a disc at the discharge end of the drum, said disc having a conical rim, the greater diameter of the rim lying on that side of the disc facing the intake end of the machine for the purpose of deflecting the grain backwardly toward the inlet of the machine.

40. A machine as claimed in claim 39 wherein the means for deflecting the materials comprise inclined obstructing plates arranged on the casing obliquely to the machine and means for blowing the materials against the plates for the separation of grain from the straw.

41. A threshing machine of the axial type having a casing with an inlet at one end and an outlet at the other end, a shaft with beaters thereon, said casing forming in its upper half adjacent the inlet, an eccentric enlargement of great depth presenting a convex impact surface to the circulating materials, said enlargement being unsymmetrical in planes at right angles to the shaft with the greatest depth at the vertex and the enlargement extending in a steady curve to a point in the vicinity of the horizontal plane passing through the shaft, and stationary working means mounted on the casing wall below said impact surface on the exit side, said enlargement being of such size to allow the whole body of the material during the helical movement automatically and repeatedly first to be thrown out of the path of the beaters in said enlargement, second to be retarded therein in free flight and third to be returned to the beater path for a new executed acceleration, the interior surface of the enlargement being formed with a smooth wall for guiding the material during its movement through the enlargement.

42. A threshing machine of the character described, comprising a casing with a threshing zone, a beater shaft therein, a straw delivery blower at the discharge end of the casing, a sieve forming the bottom part of the casing, an inclined conical surface leading from the casing towards the blower in combination with a conical body mounted on the shaft over said conical surface, adapted to form between it and the latter, an inclined annular straw passage, the conical body being axially adjustable for regulating the width of the annular channel.

43. The method of threshing which consists in feeding the material to be threshed to the descending beaters of the revolving shaft of an axial threshing machine, rhythmically and repeatedly withdrawing the whole body of material to the full normal capacity of the machine from the ascending beaters in a generally tangential direction, decelerating the same while withdrawn without interrupting the generally helical progress through the machine and re-introducing the decelerated material into the path of the beaters for reacceleration.

44. In an axial threshing machine, a casing with an intake and a discharge axially displaced from each other, a shaft in said casing with elements thereon for beating and helically moving the materials to be threshed from the intake towards the discharge end, an enlargement formed in the upper part of the casing forming a decelerating chamber above and beyond the path of the beating and conveying elements, the enlargement being of a shape to permit the material being threshed to follow a generally tangential direction out of the beater path on one side of the vertical axial plane and to guide the materials back into the path of the beating and conveying elements on the other side of the vertical plane, both the interior of the casing peripherally immediately in advance of the chamber and the wall of the latter having smooth areas circumferentially thereof permitting the free unimpeded passage of the material out of the beater path and guiding the same back into the beater path.

45. In a machine of the character set forth in claim 44 wherein the enlargement on the leading side being on a line approaching 90° from the vertical axial plane.

46. In a machine of the character set forth in claim 44 wherein the enlargement embraces less than 180° of the upper part of the casing, whereby material upon leaving the beater path is retarded by the force of gravity and by friction against the chamber wall on one side of the vertical axial plane and is guided by the wall of the chamber to the other side of the vertical axial plane and caused by the force of gravity to re-enter the beater path.

47. In an axial threshing machine, a casing with an intake and a discharge axially displaced from each other, a shaft in said casing with elements thereon for beating and helically conveying the material being threshed from the intake towards the discharge end, an enlargement formed in the upper part of the casing and forming a decelerating chamber above and beyond the path of the beating and conveying elements, said enlargement circumferentially extending beyond both sides of the vertical axial plane and permitting the material being threshed to entirely leave the beater path and enter said chamber on one side of said vertical plane and to guide the materials after passing through said plane back into the path of the beating and conveying elements on the other side of said plane, the casing and the chamber walls permitting the free and unimpeded passage of the material out of the beater path, through the decelerating chamber and back into the beater path under the influence of centrifugal force, the guiding walls of the decelerating chamber and gravity.

48. An axial threshing machine of the character described, comprising a casing generally of cylindrical form, axially spaced inlet and outlet, a revolving shaft in said casing, and beaters on said shaft which together with the casing impart to the materials being threshed a helical movement through the machine, said beaters having a predetermined clearance at the intake between the beaters and the casing, the clearance between the ends of the beaters and the casing wall being enlarged towards the discharge end of the machine to provide a gradually increasing clearance space for the straw toward the outlet end of the machine, the beater arms being of substantially the same length and the casing being enlarged in diameter towards the discharge end to obtain the increasing clearance between the ends of the beaters and the casing wall.

49. An axial threshing machine, a casing with an intake and a discharge axially displaced from each other, a shaft in said casing with elements thereon for beating and helically moving the materials to be threshed from the intake toward the discharge, an enlargement in the upper part of the casing which permits substantially the whole body of the material to be automatically and wholly thrown out of the path of the beating elements in said enlargement, to be retarded therein in free flight and to return to the beater path by its own weight, the enlargement being of a shape to permit the material to follow a generally tangential direction upon leaving the beater path and the interior surface of the enlargement forming a guiding wall for the material in its movement during at least the greater part of the free flight and return to the beater path, the enlargement of the casing on the upper half thereof being preceded by a smooth interior, with ledgelike stationary threshing means below and following said enlargement and an arcuate space below the said threshing means on the exit of the enlargement.

50. An axial threshing machine, a drum with an intake and a discharge axially displaced from each other, a shaft in said drum with elements thereon for beating and helically moving the threshing materials along the drum, a longitudinal and circumferential enlargement of such large size and shape in the upper part of the casing adjacent the intake that it permits the whole of the material to come automatically and repeatedly out of operative contact with the ascending elements, to decelerate in free flight in the direction of movement and re-enter the path of the descending elements for a new executed beating and acceleration on the remaining circumference of the drum, the enlargement being of a shape to permit the material to follow a generally tangential direction upon leaving the beater path and the interior surface of the enlargement forming a guiding wall for the material during at least the greater part of its movement past the enlargement and threshing ledges both below the intake and the place of re-entrance of the material, and means connected to the casing in a plane lying essentially at right angles with the beater shaft and projecting radially towards the beaters, said means being circumferentially disposed to oppose the helical and axial travel of the material and co-operating with the enlargement to effect the desired threshing of the materials.

51. The method of threshing in an axial threshing machine having a casing with an intake and a discharge axially displaced from each other, a shaft in the casing with elements thereon for beating and helically moving the materials to be threshed from the intake towards the discharge and a longitudinal and circumferential enlargement in one part of the casing which consists in causing the material during its helical movement through the machine automatically and repeatedly, first to be thrown tangentially out of the path of the beating elements into said enlargement, second to be retarded therein in free flight guided by the wall of the enlargement and third to be returned to the beater path for a new executed acceleration on the rest of the casing circumference.

52. In an axial threshing machine, a rotating element, beating conveyors thereon and a casing for said rotary element having adjacent the intake end one part closely approaching the path of the beaters and another part above said first named part gradually receding on one side from the path of the beaters in the direction of movement thereof to form a decelerating chamber above the beaters large enough in depth and width to accommodate the whole body of material capable of being handled by the machine, said second part of the casing in which the decelerating chamber wall is formed approaching the beaters on the exit side in a less gradual curve than that of the gradually receding part to facilitate re-introduction of the materials after deceleration into the beater path, both the interior of the casing peripherally immediately in advance of the decelerating chamber and the wall of the latter having smooth circumferential areas permitting the free unimpeded passage of the material through the decelerating chamber.

FELIX SCHLAYER.

CERTIFICATE OF CORRECTION.

Patent No. 2,050,631.   August 11, 1936.

FELIX SCHLAYER.

It is hereby certified that error appears in the above numbered patent requiring correction as follows: In the drawings, Sheet 8, Figure 35, for the section lines "III-III", "V-V" and "VIII-VIII" read 36-36, 38-38, and 41-41 respectively; and that the said Letters Patent should be read with these corrections therein that the same may conform to the record of the case in the Patent Office.

Signed and sealed this 22nd day of December, A. D. 1936.

(Seal)

Henry Van Arsdale
Acting Commissioner of Patents.